US012656107B2

(12) United States Patent (10) Patent No.: US 12,656,107 B2
Nakachi et al. (45) Date of Patent: Jun. 16, 2026

(54) SHEET IDENTIFICATION DEVICE, IMAGE PROCESSING APPARATUS, AND SHEET IDENTIFICATION METHOD

(71) Applicant: KYOCERA Document Solutions Inc., Osaka (JP)

(72) Inventors: Kazuhiro Nakachi, Osaka (JP); Kazunori Tanaka, Osaka (JP); Takuya Miyamoto, Osaka (JP); Shinichiro Yamada, Osaka (JP); Rui Hamabe, Osaka (JP); Kanako Morimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 468 days.

(21) Appl. No.: 18/255,704

(22) PCT Filed: Nov. 29, 2021

(86) PCT No.: PCT/JP2021/043675
§ 371 (c)(1),
(2) Date: Oct. 10, 2023

(87) PCT Pub. No.: WO2022/118798
PCT Pub. Date: Jun. 9, 2022

(65) Prior Publication Data
US 2025/0362123 A1 Nov. 27, 2025

(30) Foreign Application Priority Data

Dec. 4, 2020 (JP) ................................ 2020-201449
Dec. 4, 2020 (JP) ................................ 2020-201450

(51) Int. Cl.
*G01B 11/24* (2006.01)
*G01B 11/25* (2006.01)
(Continued)

(52) U.S. Cl.
CPC ........ *G01B 11/2504* (2013.01); *G01B 11/303* (2013.01); *G03G 15/5029* (2013.01);
(Continued)

(58) Field of Classification Search
CPC .............. G01B 11/2504; G01B 11/303; G03G 15/5029
See application file for complete search history.

(56) References Cited

U.S. PATENT DOCUMENTS

2004/0005157 A1 1/2004 Akita
2004/0189938 A1* 9/2004 Eagan .................... A61B 3/156
351/208

FOREIGN PATENT DOCUMENTS

JP H1023203 * 1/1998
JP H1023203 A 1/1998
JP 2004038879 A 2/2004

* cited by examiner

*Primary Examiner* — Ibrahim Siddo
(74) *Attorney, Agent, or Firm* — Alleman Hall LLP

(57) ABSTRACT

A sheet identification device includes a light irradiation portion. When forming an identification image (Im1), the light irradiation portion projects, on an identification region (R1), pattern light (P1) including a vertical component (C1) along a conveying direction (D1) of a sheet and a horizontal component (C2) orthogonal to the vertical component (C1). The identification image (Im1) is an image of the identification region (R1) of the surface of the sheet on which image formation or image reading is performed, and is used for identifying surface information on the state of the surface of the sheet.

16 Claims, 18 Drawing Sheets

(51) Int. Cl.
$$
\begin{array}{lll}
\textit{G01B 11/30} & \text{(2006.01)} \\
\textit{G03G 15/00} & \text{(2006.01)} \\
\textit{H04N 1/00} & \text{(2006.01)}
\end{array}
$$

(52) U.S. Cl.
CPC ..... *G03G 15/6558* (2013.01); *H04N 1/00724* (2013.01); *H04N 1/00726* (2013.01); *H04N 1/00734* (2013.01); *G03G 2215/00616* (2013.01); *G03G 2215/00759* (2013.01)

FIG.3

FIG.5
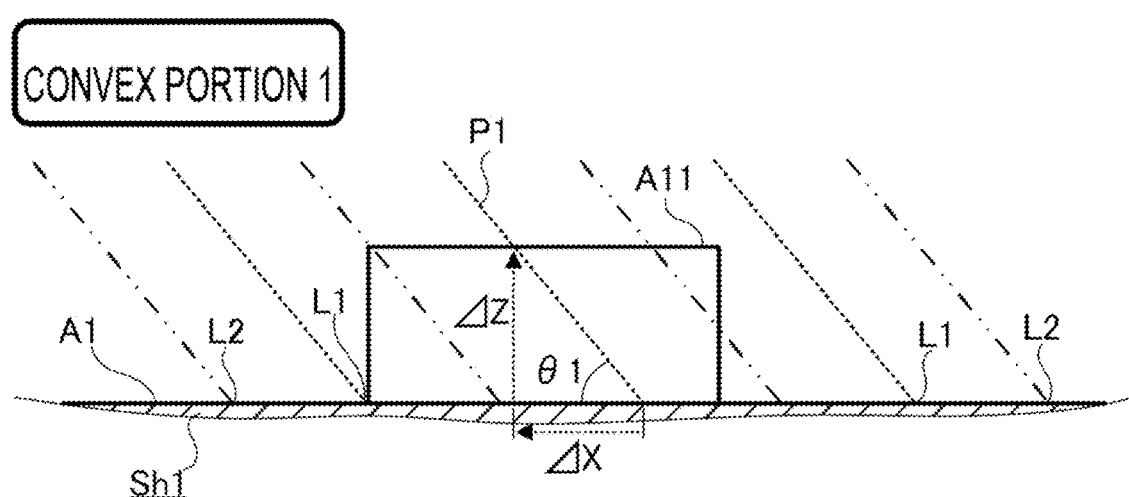
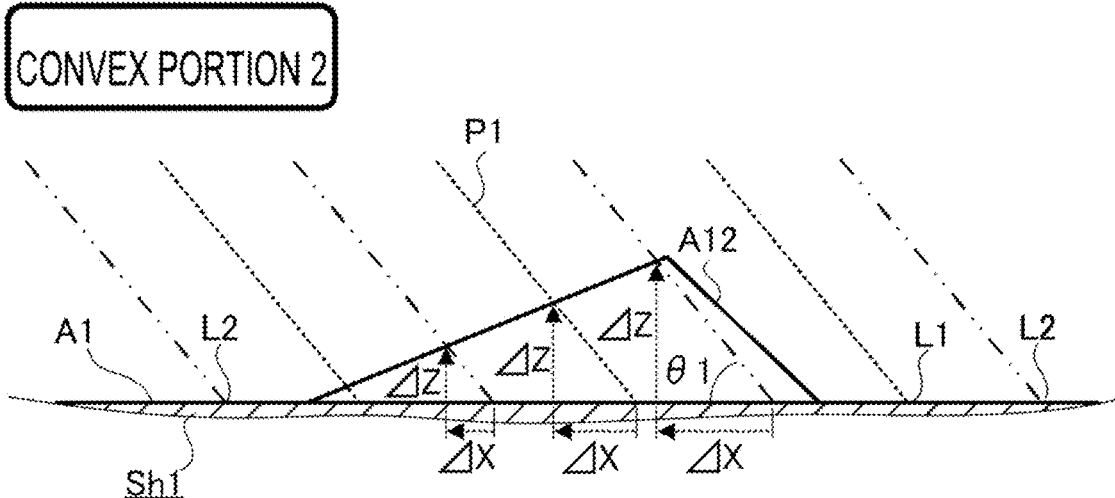

FIG.6
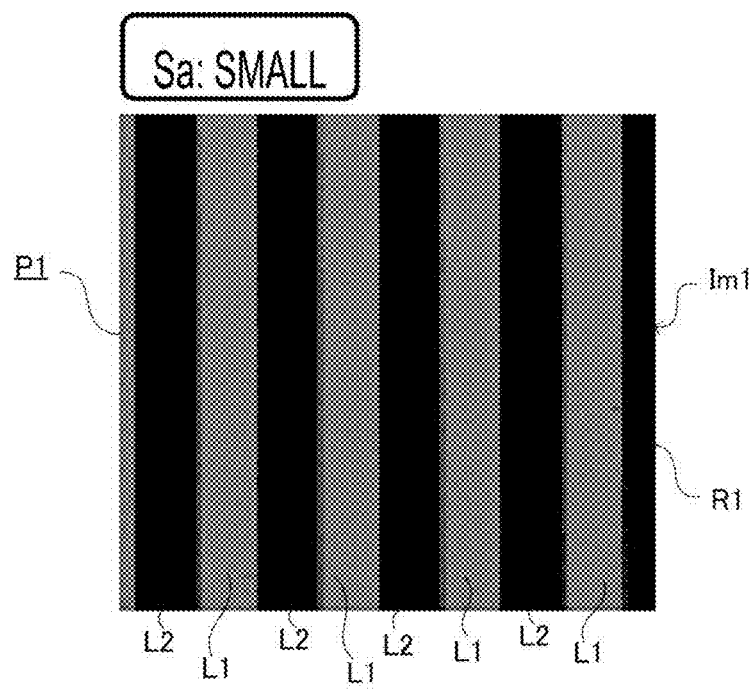
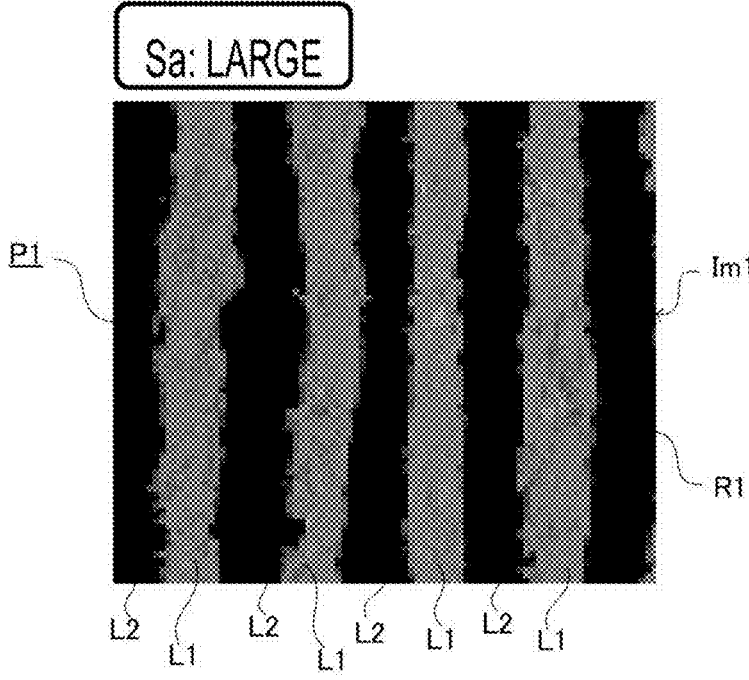

FIG.8
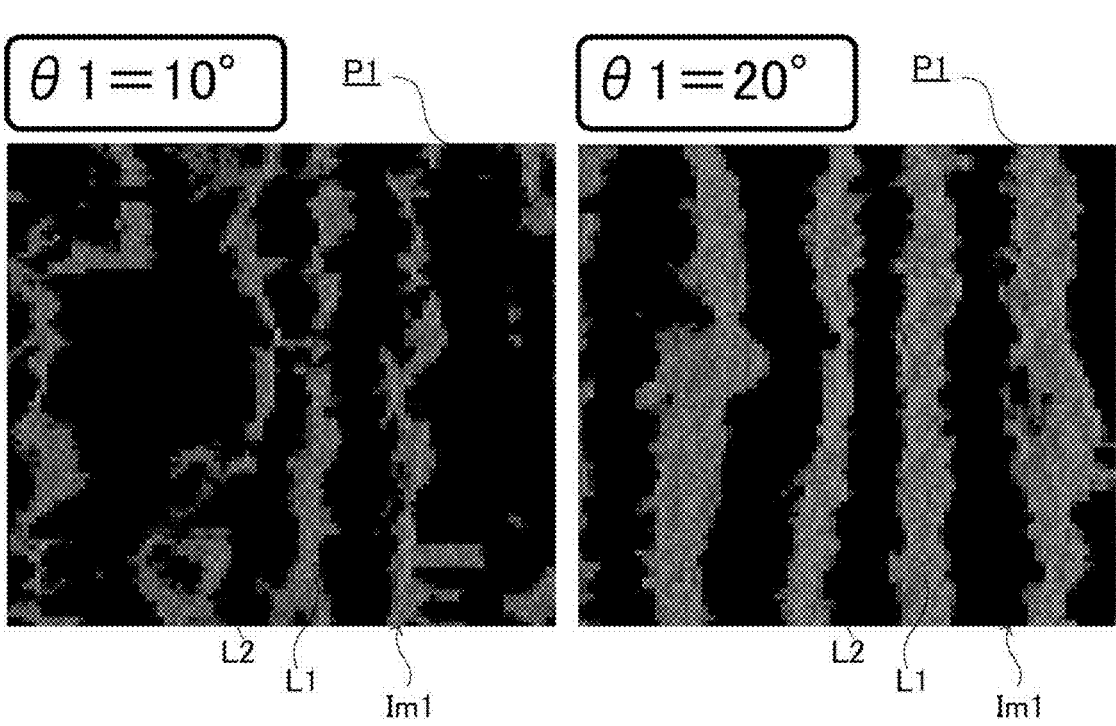
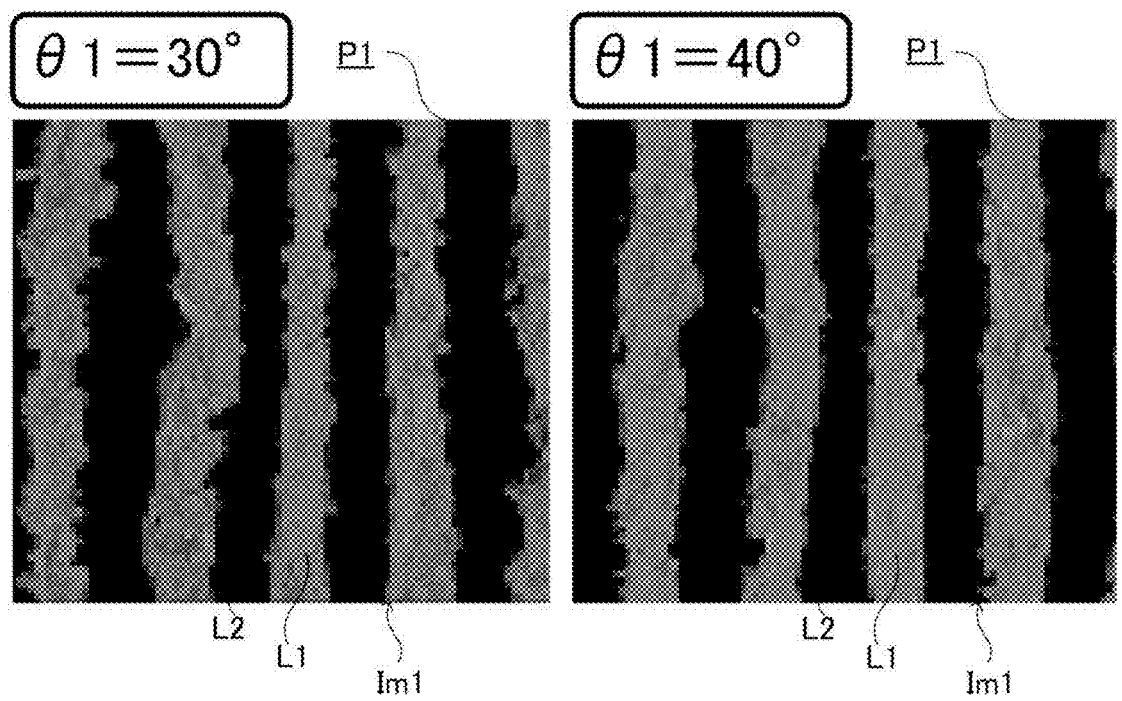

FIG.10

| WIDTH | θ1 | RELATIONSHIP BETWEEN IRRADIATION DIRECTION AND FIBER DIRECTION | $R^2$ OF STANDARD DEVIATION σ [pix.] |
|---|---|---|---|
| BRIGHT WIDTH200um, DARK WIDTH200um | 40° | SAME | 0.8956 |
| BRIGHT WIDTH200um, DARK WIDTH200um | 40° | 90° | 0.8523 |
| BRIGHT WIDTH160um, DARK WIDTH160um | 40° | SAME | 0.9151 |
| BRIGHT WIDTH160um, DARK WIDTH160um | 40° | 90° | 0.8927 |
| BRIGHT WIDTH120um, DARK WIDTH120um | 40° | SAME | 0.9651 |
| BRIGHT WIDTH120um, DARK WIDTH120um | 40° | 90° | 0.9112 |
| BRIGHT WIDTH100um, DARK WIDTH100um | 40° | SAME | 0.9658 |
| BRIGHT WIDTH100um, DARK WIDTH100um | 40° | 90° | 0.8892 |
| BRIGHT WIDTH80um, DARK WIDTH80um | 40° | SAME | 0.9684 |
| BRIGHT WIDTH80um, DARK WIDTH80um | 40° | 90° | 0.8494 |
| BRIGHT WIDTH60um, DARK WIDTH60um | 40° | SAME | 0.9132 |
| BRIGHT WIDTH60um, DARK WIDTH60um | 40° | 90° | 0.7868 |
| BRIGHT WIDTH40um, DARK WIDTH40um | 40° | SAME | 0.8326 |
| BRIGHT WIDTH40um, DARK WIDTH40um | 40° | 90° | 0.6635 |

SHEET IDENTIFICATION DEVICE, IMAGE PROCESSING APPARATUS, AND SHEET IDENTIFICATION METHOD

TECHNICAL FIELD

The present invention relates to a sheet identification device, an image processing apparatus, and a sheet identification method.

BACKGROUND

As a related technique, there is known a technique used in an image forming apparatus such as a copier or a laser printer, which automatically identifies the type of a sheet (paper) from an image of the surface of the sheet (see, for example, Patent Literature 1). An image reading apparatus according to the related technique is provided with a light emitting element that obliquely irradiates the surface of the sheet with light, and an area sensor that reads the irradiation region as an image, and reads information on the sheet from the reading result.

In this image reading apparatus, the surface roughness of the sheet is estimated by detecting a shadow image caused by the asperities on the surface of the sheet from the image of the irradiation region. When the asperities on the surface of the sheet are large, the contrast is higher than when the asperities are small, so that the magnitude of the asperities on the surface can be estimated from the contrast. Further, this image reading apparatus is configured to set the incident direction of the light from the light emitting element at an angle of 45 degrees with respect to the conveying direction of the sheet so as to maintain the fiber direction of the sheet and the incident direction of the light at an angle of approximately 45 degrees and reduce the variation in the detection accuracy depending on the fiber direction.

CITATION LIST

Patent Literature

Patent Literature 1: Japanese Unexamined Patent Application Publication No. 2004-038879

SUMMARY OF INVENTION

Technical Problem

However, the configuration of the related technique described above has a problem that the arrangement of the light irradiation portion (light emitting element) is restricted, for example, the incident direction of the light from the light emitting element is to be set at an angle of 45 degrees with respect to the conveying direction of the sheet, in order to suppress the variation in detection accuracy depending on the fiber direction.

An object of the present invention is to provide a sheet identification device and an image processing apparatus which can easily improve the degree of freedom in the arrangement of the light irradiation portion for identifying the state of the surface of the sheet.

Solution to Problem

A sheet identification device according to one aspect of the present invention includes a light irradiation portion. When forming an identification image, the light irradiation portion projects, on an identification region, pattern light including a vertical component along a conveying direction of a sheet and a horizontal component orthogonal to the vertical component. The identification image is an image of the identification region of the surface of the sheet on which image formation or image reading is performed, and is used for identifying surface information on the state of the surface of the sheet.

An image processing apparatus according to another aspect of the present invention includes the sheet identification device and an image processing portion. The image processing portion executes at least one of the image formation and the image reading on the sheet.

Advantageous Effects of Invention

According to the present invention, it is possible to provide a sheet identification device and an image processing apparatus which can easily improve the degree of freedom in the arrangement of the light irradiation portion for identifying the state of the surface of the sheet.

BRIEF DESCRIPTION OF THE DRAWINGS

FIG. 3 is a schematic diagram showing a light irradiation portion and an imaging portion of a sheet identification device according to the first embodiment.

FIG. 5 is a schematic diagram showing the principle of sheet surface asperity detection in the sheet identification device according to the first embodiment.

FIG. 6 is a diagram showing an example of an identification image obtained in the sheet identification device according to the first embodiment.

FIG. 8 is a diagram showing an example of the identification image when a predetermined angle obtained in the sheet identification device according to the first embodiment is changed.

FIG. 10 is a table showing the results of calculating the determination coefficient while changing the line width of pattern light and the relationship between the irradiation direction of the pattern light and the fiber direction in the sheet identification device according to the first embodiment.

DETAILED DESCRIPTION

Embodiments of the present invention will be described below with reference to the accompanying drawings. The following embodiments are examples of embodying the present invention and do not limit the technical scope of the present invention.

First Embodiment

[1] Overall Configuration of Image Processing Apparatus

First, an overall configuration of an image processing apparatus 10 according to the present embodiment will be described with reference to FIG. 1 and FIG. 2.

The image processing apparatus 10 according to the present embodiment is a multifunction peripheral having a plurality of functions such as a scanning function for reading an image (image data) from a document sheet, a printing function for forming an image based on the image data, a facsimile function, and a copy function. The image processing apparatus 10 may be a printer, a scanner, a facsimile machine, a copier, or the like as long as it has an image processing function including at least one of a function of forming an image and a function of reading an image.

Figure 1:
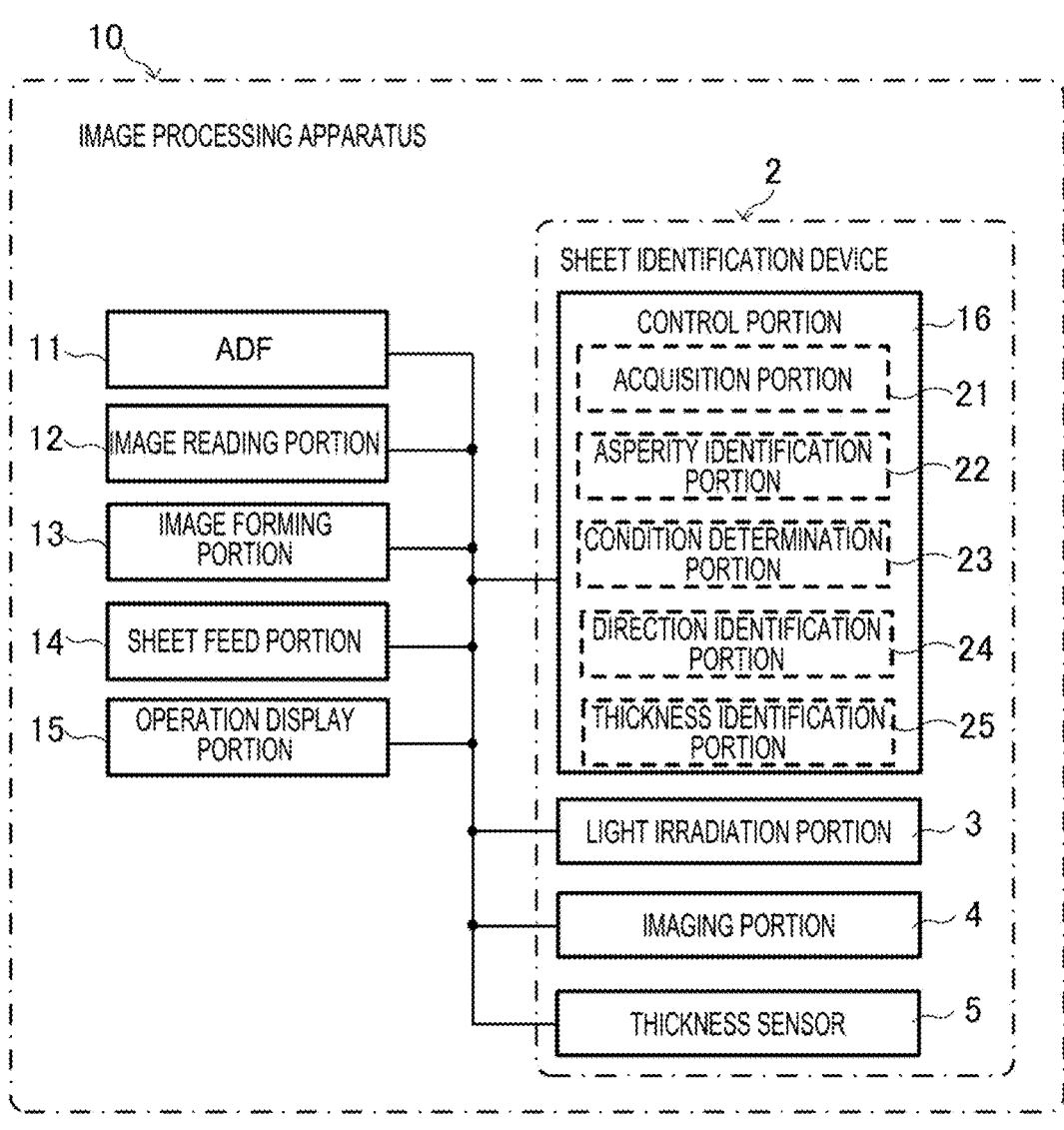
FIG. 1 is a schematic block diagram of an image processing apparatus according to a first embodiment.

As shown in FIG. 1, the image processing apparatus 10 includes an automatic document conveying device 11, an image reading portion 12, an image forming portion 13, a sheet feed portion 14, an operation display portion 15, and a control portion 16. Since the automatic document conveying device 11 is an auto document feeder (ADF), it is indicated as "ADF" in FIG. 1 and referred to as an "ADF 11" in the following description. In the present embodiment, as shown in FIG. 2, the image processing apparatus 10 includes a housing 100. The ADF 11, the image reading portion 12, the image forming portion 13, the sheet feed portion 14, the operation display portion 15, and the control portion 16 are provided in the housing 100.

The ADF 11 conveys a sheet (document sheet) whose image is read by the image reading portion 12. The ADF 11 includes a document sheet loading portion, a plurality of conveying rollers, a document sheet holder, a sheet discharge portion, and the like.

The image reading portion 12 reads an image from a sheet and outputs image data corresponding to the read image. The image reading portion 12 includes a document sheet table, a light source, a plurality of mirrors, an optical lens, a charge coupled device (CCD), and the like.

Figure 2:
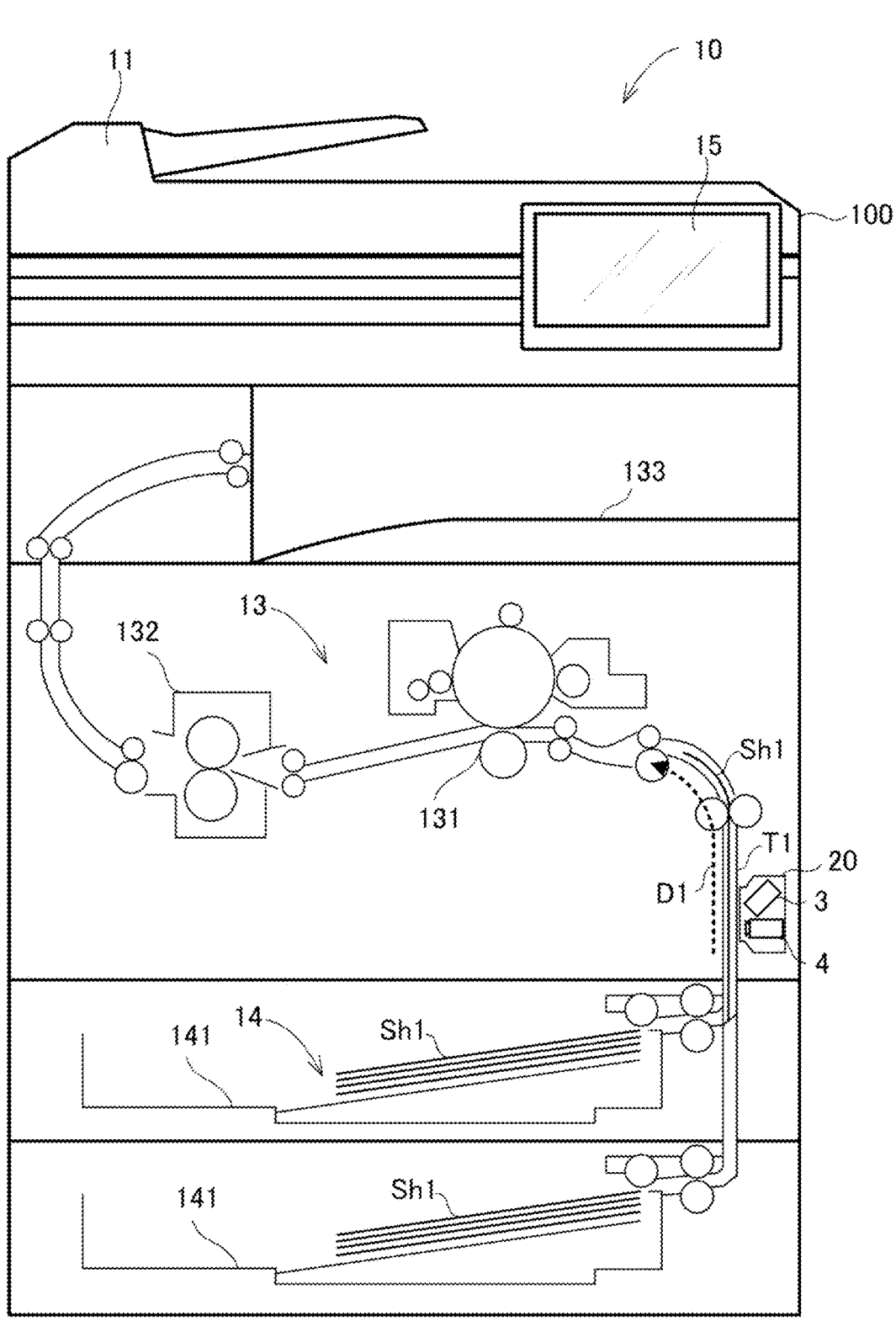
FIG. 2 is a schematic diagram showing the exterior and internal configuration of the image processing apparatus according to the first embodiment.

The image forming portion 13 forms an image on a sheet Sh1 based on the image data output from the image reading portion 12 (see FIG. 2). In addition, the image forming portion 13 forms an image on a sheet Sh1 based on image data input from an information processing apparatus, such as a personal computer, external to the image processing apparatus 10. In the present embodiment, as an example, as shown in FIG. 2, the image forming portion 13 includes a transfer device 131, a fixing device 132, a sheet discharge tray 133, and the like, and forms an image on a sheet Sh1 using an electrophotographic method. The image forming portion 13 is not necessarily configured to form only monochrome images, and may be configured to form full-color images using four colors of C (cyan), M (magenta), Y (yellow), and K (black). In addition, the image forming portion 13 may form an image on a sheet using an image forming method other than the electrophotographic method, such as an inkjet method.

The image forming portion 13 forms an image on a sheet Sh1 using toner as a developer. Specifically, the image forming portion 13 forms an electrostatic latent image on a charged surface of the photoconductor drum by irradiating the surface with a laser beam, and forms a toner image on the surface of the photoconductor drum by developing the electrostatic latent image with toner. The transfer device 131 transfers the toner image to the sheet Sh1 conveyed through a conveying path T1 (see FIG. 2). The fixing device 132 melts and fixes the toner image transferred to the sheet Sh1 onto the sheet Sh1. For example, the fixing device 132 includes a fixing roller and a pressure roller, and heats the toner image transferred to the sheet Sh1 and presses the sheet Sh1, thereby fixing the toner image onto the sheet Sh1. The sheet Sh1 on which the image has been formed is discharged to the sheet discharge tray 133. When the image forming portion 13 forms an image using an inkjet method, ink (another example of the developer) is supplied instead of the toner.

The sheet feed portion 14 supplies the sheet Sh1 to the image forming portion 13. The sheet feed portion 14 includes a plurality of sheet feed cassettes 141, a manual feed tray, and a plurality of conveying rollers. The sheet feed portion 14 conveys the sheet Sh1 from the plurality of sheet feed cassettes 141, the manual feed tray, or the like through the conveying path T1 by the plurality of conveying rollers and the like to supply the sheet Sh1 to the image forming portion 13. The image forming portion 13 forms an image on the sheet Sh1 supplied from the sheet feed portion 14 through the conveying path T1.

The operation display portion 15 is a user interface in the image processing apparatus 10. The operation display portion 15 includes a display portion, such as a liquid crystal display, for displaying various types of information in response to a control instruction from the control portion 16, and an operation portion, such as a switch or a touch panel, for inputting various types of information to the control portion 16 in response to a user's operation. In addition, the image processing apparatus 10 may include, as a user interface, an audio output portion, an audio input portion, and the like, in addition to or instead of the operation display portion 15.

The control portion 16 comprehensively controls the image processing apparatus 10. The control portion 16 is mainly composed of a computer system including one or more processors and one or more memories. In the image processing apparatus 10, the functions of the control portion 16 are realized by one or more processors executing programs. The programs may be stored in advance in the one or more memories, may be provided through a telecommunications line such as the Internet, or may be provided by being stored in on a non-transitory recording medium readable by the computer system, such as a memory card or an optical disk. The one or more processors are composed of one or more electronic circuits, including a semiconductor integrated circuit. Further, the computer system in the present disclosure includes a microcontroller having one or more processors and one or more memories. The control portion 16 may be a control portion provided separately from the main control portion which comprehensively controls the image processing apparatus 10.

In addition, the image processing apparatus 10 further includes a storage portion, a communication portion, a power supply portion, and the like. The storage portion includes one or more nonvolatile memories, and stores in advance information, such as control programs, for causing the control portion 16 to execute various types of processing. The communication portion is an interface that executes data communication between the image processing apparatus 10 and an external apparatus connected via a communication network such as the Internet or a local area network (LAN). The power supply portion is a power supply circuit that generates (outputs) electric power for the operation of the image processing apparatus 10.

As a technique related to this type of image processing apparatus 10, there is known a technique which is used in an image forming apparatus such as a copier or a laser printer to automatically identify the type of a sheet (paper) from an image of the surface of the sheet. An image reading apparatus according to the related technique includes a light emitting element that obliquely irradiates the surface of the sheet with light, and an area sensor that reads the irradiation region as an image, and reads information on the sheet from the read result.

In this image reading apparatus, the surface roughness of the sheet is estimated by detecting a shadow image caused by the asperities on the surface of the sheet from the image of the irradiation region. When the asperities on the surface of the sheet are large, the contrast is higher than when the asperities are small, so that the magnitude of the asperities on the surface can be estimated from the contrast. Further, this image reading apparatus is configured to set the incident direction of the light from the light emitting element at an angle of 45 degrees with respect to the conveying direction of the sheet so as to maintain the fiber direction of the sheet and the incident direction of the light at an angle of approximately 45 degrees and reduce the variation in the detection accuracy depending on the fiber direction.

However, with the above-described configuration of the related technique, it is necessary to make the angle of the light incident direction with respect to the surface of the sheet shallow (small) in order to obtain an image having a high sensitivity to asperities, and thus the obtained image becomes dark as a whole, and the shadow caused by the asperities is easily buried in noise.

In contrast, in the present embodiment, the image processing apparatus 10 can easily improve the accuracy of identifying the asperities on the surface of the sheet with the configuration to be described below.

That is, as shown in FIG. 1, the image processing apparatus 10 according to the present embodiment includes a sheet identification device 2. The sheet identification device 2 according to the present embodiment is integrated with the image processing apparatus 10.

The sheet identification device 2 includes an acquisition portion 21 and an asperity identification portion 22. The acquisition portion 21 acquires an identification image Im1 (see FIG. 4). The identification image Im1 is an image of an identification region R1 (see FIG. 4) of the surface A1 (see FIG. 3) of the sheet Sh1 on which image formation or image reading is performed. The identification region R1 is a region on the surface A1 of the sheet Sh1 on which pattern light P1 (see FIG. 3) is projected. The asperity identification portion 22 identifies asperity information on the asperities on the surface A1 of the sheet Sh1 based on the identification image Im1. In the present embodiment, the acquisition portion 21 and the asperity identification portion 22, which are constituent elements of the sheet identification device 2, are provided in the control portion 16 as functions of the control portion 16.

With the above configuration, the sheet identification device 2 according to the present embodiment and the image processing apparatus 10 provided with the sheet identification device 2 have an advantage that the accuracy of identifying the asperities on the surface A1 of the sheet Sh1 can be easily improved. In other words, the identification region R1 of the surface A1 of the sheet Sh1 is not uniformly irradiated with the light from the light emitting element, but rather the pattern light P1 is projected thereon. Therefore, the asperity identification portion 22 can identify the asperity information on the asperities on the surface A1 of the sheet Sh1 from the degree of deformation or distortion of the pattern light P1 in the identification image Im1. Therefore, the asperity information can be identified from a relatively bright identification image Im1 without making the angle of the light incident direction with respect to the surface A1 of the sheet Sh1 shallow (small) as in the related technique, and as a result, the accuracy of identifying the asperities can be easily improved as compared with the related technique.

In addition, the configuration of the related technique described above has a problem that the arrangement of the light irradiation portion (light emitting element) is restricted, for example, the incident direction of the light from the light emitting element is to be set at an angle of 45 degrees with respect to the sheet conveying direction, in order to suppress the variation in detection accuracy depending on the fiber direction.

In contrast, in the present embodiment, with the configuration to be described below, the image processing apparatus 10 can easily improve the degree of freedom in the arrangement of the light irradiation portion for identifying the state of the surface of the sheet.

That is, in the present embodiment, the sheet identification device 2 includes a light irradiation portion 3 (see FIG. 1). When forming the identification image Im1, the light irradiation portion 3 projects, on the identification region R1, pattern light P1 (see FIG. 11) including a vertical component C1 (see FIG. 11) along the conveying direction D1 (see FIG. 11) of the sheet Sh1 and a horizontal component C2 (see FIG. 11) orthogonal to the vertical component C1. The identification image Im1 is an image of the identification region R1 of the surface A1 of the sheet Sh1 on which image formation or image reading is performed, which is used for identifying surface information on the state of the surface A1 of the sheet Sh1. In this way, the identification region R1 of the surface A1 of the sheet Sh1 is not uniformly irradiated with the light from the light emitting element, but rather the pattern light P1 is projected thereon. In addition, since the pattern light P1 includes the vertical component C1 and the horizontal component C2 which are orthogonal to each other, the pattern light P1 itself can suppress, for example, the variation in the detection accuracy depending on the fiber direction independently of the arrangement of the light irradiation portion 3. Therefore, the configuration of the present embodiment has an advantage that the degree of freedom in the arrangement of the light irradiation portion 3 for identifying the state of the surface A1 of the sheet Sh1 can be easily improved.

In addition, it is difficult to identify the fiber direction of the sheet with the configuration of the related technique described above because the magnitude of the asperities is estimated while ignoring the influence of the fiber direction of the sheet in this configuration.

In contrast, in the present embodiment, the image processing apparatus 10 can easily identify the fiber direction of the sheet with the configuration to be described below.

That is, in the present embodiment, the fiber direction of the sheet Sh1 can also be identified by using the pattern light P1 including the vertical component C1 and the horizontal component C2 as described above. Namely, the sheet identification device 2 includes a direction identification portion 24 (see FIG. 1) in addition to the acquisition portion 21. The acquisition portion 21 acquires an identification image Im1 which is an image of an identification region R1 of the surface A1 of the sheet Sh1, on which pattern light P1 including the vertical component C1 and the horizontal component C2 is projected. The direction identification portion 24 identifies the fiber direction of the surface A1 of the sheet Sh1 based on the identification image Im1. In the present embodiment, the acquisition portion 21 and the direction identification portion 24, which are constituent elements of the sheet identification device 2, are provided in the control portion 16 as functions of the control portion 16. In this way, the identification region R1 of the surface A1 of the sheet Sh1 is not uniformly irradiated with the light from the light emitting element, but rather the pattern light P1 is projected thereon. Moreover, since the pattern light P1 includes the vertical component C1 and the horizontal component C2, which are orthogonal to each other, the fiber direction can be identified from the identification image Im1 by using the dependence of each of the vertical component C1 and horizontal component C2 on the fiber direction. Therefore, the configuration of the present embodiment has an advantage that the fiber direction of sheet Sh1 can be easily identified.

The method for identifying the fiber direction will be described in detail in the section of "[7.2] Fiber Direction Identification Method".

The sheet identification device 2 according to the present embodiment constitutes the image processing apparatus 10 together with the image processing portion (the image reading portion 12 and the image forming portion 13). In other words, the image processing apparatus 10 according to the present embodiment includes the sheet identification device 2 and an image processing portion that executes at least one of image formation and image reading on the sheet Sh1.

[2] Definitions

The "sheet" in the present disclosure is a sheet on which image formation or image reading is to be performed. In the present embodiment, as an example, it is assumed that the sheet Sh1 to be irradiated with the pattern light P1 is a sheet Sh1 on which image formation is to be performed by the image forming portion 13. That is, in the present embodiment, the sheet Sh1 conveyed through the conveying path T1 by the sheet feed portion 14 is to be irradiated with the pattern light P1. However, the present disclosure is not limited to this example, and the sheet to be irradiated with the pattern light P1 may be the sheet (document sheet) on which image reading is to be performed by the image reading portion 12, that is, the sheet conveyed by the ADF 11. In addition, although the sheet Sh1 is paper as an example in the present embodiment, it is not limited to paper, and may be, for example, a resin film.

The "pattern light" in the present disclosure is, for example, light that is projected from a light irradiation portion 3 (see FIG. 1) onto a projection surface (here, the surface A1 of the sheet Sh1) in a controlled shape and direction, and is so-called structured light. That is, the region (identification region R1) irradiated with the pattern light P1 is not uniformly irradiated with the pattern light P1, but a figure, a design, a picture, a pattern, a symbol, a character, a number, or the like corresponding to the pattern light P1 is projected thereon. Specifically, by irradiating the identification region R1 with the pattern light P1, a luminance distribution of a pattern corresponding to the pattern light P1, such as a stripe pattern, a lattice pattern, or an arc pattern, is produced in the identification region R1. Further, the pattern light P1 is not limited to a fixed pattern such as a still image, and a luminance distribution of a pattern that changes with time such as a moving image (including an animation) may be produced in the identification region R1.

The "identification image" in the present disclosure is, for example, an image of the identification region R1 on which the pattern light P1 is projected, which is captured by an imaging portion 4. That is, the identification image Im1 includes the pattern light P1 projected onto the identification region R1, or more strictly, a luminance distribution of a pattern corresponding to the pattern light P1 produced in the identification region R1 by projecting the pattern light P1 on the identification region R1. The identification image Im1 may be either a monochrome image or a color image, and may be either a still image or a moving image.

The "asperity information" in the present disclosure is information on the asperities on the surface A1 of the sheet Sh1, and includes information such as the height (or depth) of the asperities and/or the size of the asperities in plan view. The surface (A1) of the sheet (Sh1) has asperities including at least one of a concave portion and a convex portion. That is, the surface A1 may include only a plurality of concave portions or a plurality of convex portions. Further, the surface A1 may include a plurality of concave portions and one convex portion. In this case, as an example, the surface A1 includes one net-like convex portion and a plurality of concave portions consisting of mesh portions surrounded by this convex portion. Similarly, as an example, the surface A1 may include one net-like concave portion and a plurality of convex portions consisting of mesh portions surrounded by this concave portion.

The asperities (concave portions and convex portions) of the surface A1 have extremely small sizes that cannot be individually identified with the naked eye, and the surface A1 of one sheet Sh1 includes a large number of asperities. That is, the asperities are microscopic compared to the entire surface A1, and when a person looks at the surface A1, the asperities make the surface A1 look like a rough "satin finish". Such a large number of microscopic asperities are formed, for example, by a large number of fibers constituting paper when the sheet Sh1 is paper, or by embossing or the like when the sheet Sh1 is a resin film. Information on such microscopic asperities includes an index representing surface roughness, such as an arithmetic average height (Sa) or an arithmetic average height of lines (Ra).

The "fiber direction" in the present disclosure is the direction of the fibers on the surface A1 of the sheet Sh1, and is, for example, the extending direction of a large number of fibers constituting paper when the sheet Sh1 is paper, i.e., the paper grain direction. Generally, the sheet Sh1 has a "long grain" in which the fiber direction is along the long side of the sheet Sh1, and a "short grain" in which the fiber direction is along the short side of the sheet Sh1. The conveying direction D1 (see FIG. 2) of the sheet Sh1 in the image processing apparatus 10 is a direction along the long side or the short side of the sheet Sh1. Therefore, basically, the fiber direction is along the conveying direction D1 of the sheet Sh1 or along a direction orthogonal to the conveying direction D1.

The "surface information" in the present disclosure is information on the state of the surface A1 of the sheet Sh1 (surface state), and includes, for example, at least one of the asperity information and the fiber direction. That is, the identification image Im1 used for identifying the surface information may be used for identifying the asperity information, or the fiber direction, or both the asperity information and the fiber direction.

[3] Sheet Identification Device

Next, a configuration of the sheet identification device 2 according to the present embodiment will be described in more detail with reference to FIG. 1 to FIG. 4.

In the present embodiment, the sheet identification device 2 includes an acquisition portion 21, an asperity identification portion 22, a condition determination portion 23, a direction identification portion 24, a thickness identification portion 25, a light irradiation portion 3, an imaging portion 4, and a thickness sensor 5. The acquisition portion 21, the asperity identification portion 22, the condition determination portion 23, the direction identification portion 24, and the thickness identification portion 25 are provided in the control portion 16 as functions of the control portion 16. That is, in the present embodiment, the image processing apparatus 10 includes not only the acquisition portion 21, the asperity identification portion 22, but also the condition determination portion 23, the direction identification portion 24, and the thickness identification portion 25, as functions of the control portion 16.

The light irradiation portion 3 irradiates the surface A1 of the sheet Sh1 with the pattern light P1. That is, the light irradiation portion 3 generates pattern light P1 whose shape and direction are controlled, and irradiates the surface A1 of the sheet Sh1 with the pattern light P1, thereby projecting the pattern light P1 on the identification region R1 of the surface A1 of the sheet Sh1. With such pattern light P1 from the light irradiation portion 3, a figure, a design, a picture, a pattern, a symbol, a character, a number, or the like corresponding to the pattern light P1 is projected on the identification region R1 of the surface A1 of the sheet Sh1.

Figure 4:
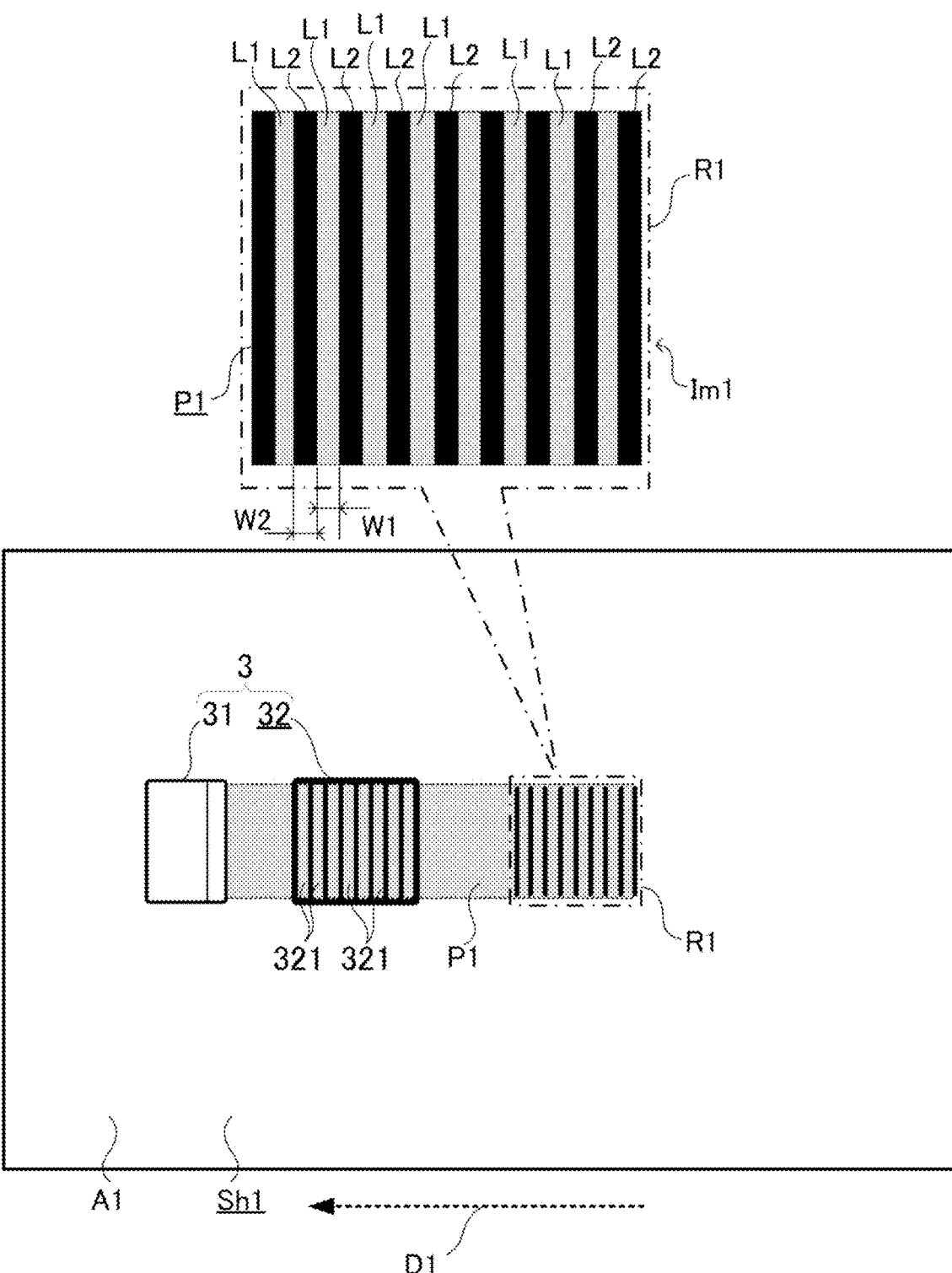
FIG. 4 is a schematic diagram showing a sheet and the light irradiation portion of the sheet identification device according to the first embodiment.

In the present embodiment, as an example, the pattern light P1 forms a stripe pattern in which a bright portion L1 and a dark portion L2 are alternately arranged on the identification region R1, as shown in FIG. 4. That is, the projection of the pattern light P1 produces a luminance distribution of a stripe pattern including the bright portions L1 and the dark portions L2 on the identification region R1. Here, the bright portions L1 are regions brighter than the dark portions L2, and in other words, the stripe pattern is a pattern in which a plurality of bright portions L1 are arranged at intervals or a pattern in which a plurality of dark portions L2 are arranged at intervals. That is, in the identification region R1, the pattern light P1 is projected to form a stripe pattern in which a linear bright portion L1 and a linear dark portion L2 are alternately arranged in a direction orthogonal to the longitudinal directions of the linear bright portion L1 and the linear dark portion L2. In FIG. 4, as an example, a linear bright portion L1 and a linear dark portion L2, which are orthogonal to the conveying direction D1 of the sheet Sh1, are arranged alternately in the conveying direction D1. In FIG. 4 and the like, the bright portion L1 is indicated by shading (dot hatching), and the dark portion L2 is indicated by blackening. Thus, deformation, distortion, or the like according to the asperities on the surface A1 is likely to appear in the stripe pattern on the identification region R1. However, the pattern light P1 that produces the stripe pattern as shown in FIG. 4 is merely an example of the pattern light P1, and the pattern light P1 can be changed as appropriate.

Figure 3:
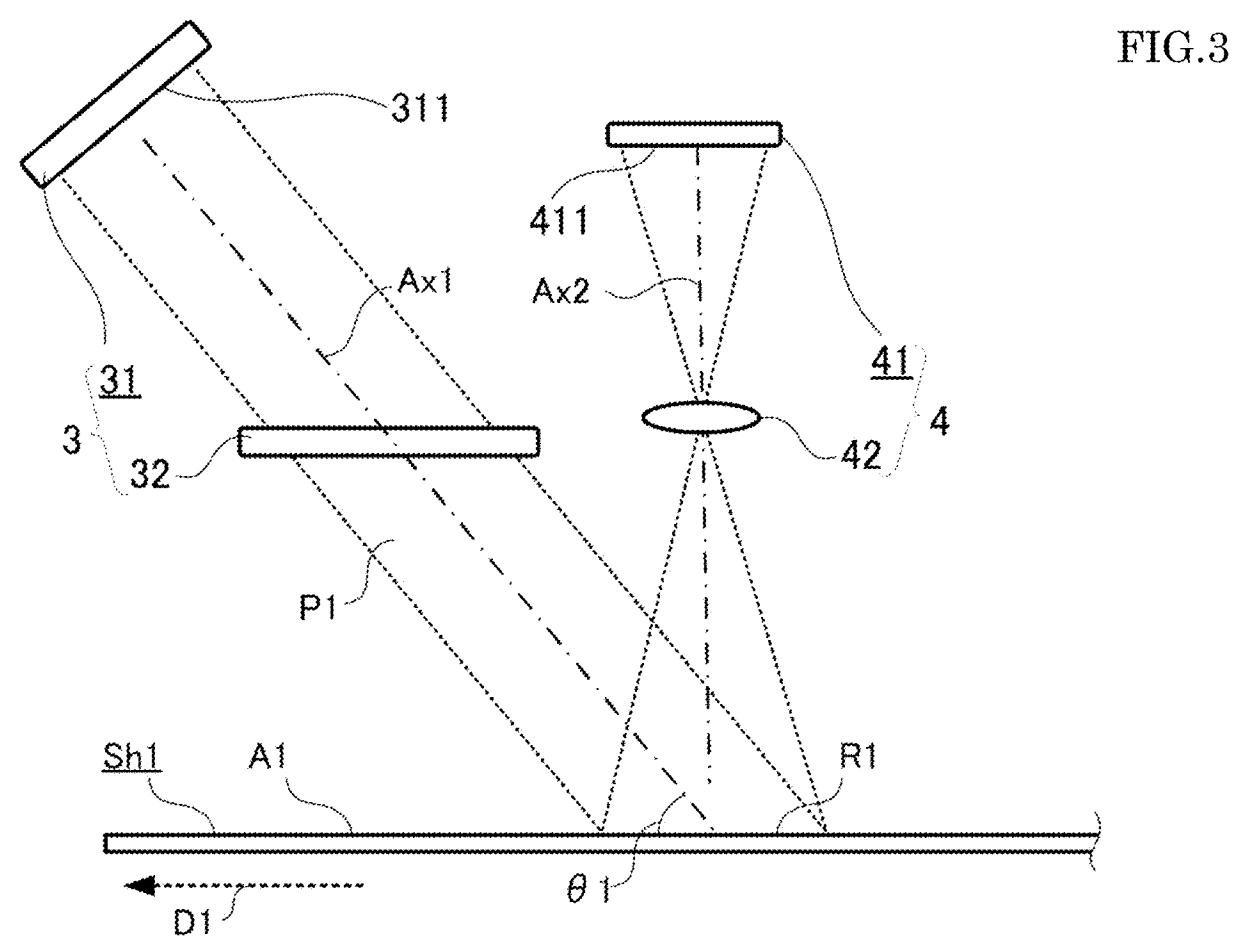

In the present embodiment, as shown in FIG. 3 and FIG. 4, the light irradiation portion 3 includes a light source 31 and a shield 32. The shield 32 blocks part of the light output from the light source 31 to allow the pattern light P1 to pass therethrough. The light source 31 includes a light emitting element that emits light when electric power is supplied thereto, and outputs light generated by the light emitting element toward the shield 32. The light source 31 is controlled by a control signal from the control portion 16, and can be switched on/off at least at the control portion 16. The shield 32 is disposed between the light source 31 and the identification region R1 of the surface A1 of the sheet Sh1, and is a component that blocks part of the light from the light source 31 and allows the rest to pass therethrough. Thus, part of the light output from the light source 31 is blocked by the shield 32, and the rest passes through the shield 32, so that the light that has passed through the shield 32 becomes pattern light P1 controlled to have a desired shape by the shield 32. Thus, the pattern light P1 can be realized with a relatively simple configuration.

In the present embodiment, as an example, the light source 31 has one or more light emitting elements such as a light emitting diode (LED) or an organic electroluminescence (EL), and makes the entire light emitting surface 311 (see FIG. 3) in a rectangular shape in plain view to substantially uniformly emit light to perform surface emission. Further, in the present embodiment, the light source 31 outputs parallel light or light close to parallel light. Therefore, the optical axis Ax1 of the pattern light P1 output from the light irradiation portion 3 (see FIG. 3) is a perpendicular line of the light emitting surface 311 passing through the center (center of gravity) of the light emitting surface 311 of the light source 31. The light source 31 may have an optical component, such as a collimator lens, for converting the light from the light emitting element into parallel light. In the present embodiment, as an example, the light source 31 outputs visible light, specifically, white light. However, the light source 31 only has to output light having a wavelength to which the imaging portion 4 is sensitive, and may output light other than white light, or may output light in a wavelength range other than visible light, such as infrared light or ultraviolet light.

In the present embodiment, as an example, the shield 32 is a rectangular plate-shaped component that absorbs or reflects light from the light source 31, and has one or more slits 321 (see FIG. 4). Thus, part of the light output from the light source 31 is blocked by the shield 32, and the rest passes through the shield 32 through the slit 321 of the shield 32. As illustrated in FIG. 4, to realize the pattern light P1 that forms a stripe pattern in the identification region R1, the shield 32 has a plurality of linear slits 321. Thus, in the identification region R1 irradiated with the pattern light P1, the light that has passed through the slits 321 becomes bright portion L1, and the shadow of the shield 32 becomes the dark portion L2, so that the stripe pattern is projected. However, the present disclosure is not limited to the configuration in which the light that has passed through the slit 321 becomes the bright portion L1 as described above, and the pattern light P1 may be realized by, for example, "interference stripes" utilizing interference of light.

Here, a first imaginary straight line connecting the light irradiation portion 3 that applies the pattern light P1 and the center of the identification region R1 is inclined at a predetermined angle θ1 with respect to a second imaginary straight line extending along the conveying direction D1 of the sheet Sh1. In the present embodiment, in the identification region R1, the surface A1 of the sheet Sh1 is along the conveying direction D1 of the sheet Sh1, so that the angle between the first imaginary straight line and the surface A1 of the sheet Sh1 is the predetermined angle θ1. Further, since the first imaginary straight line is the optical axis Ax1 of the pattern light P1, the optical axis Ax1 of the pattern light P1 is inclined at the predetermined angle θ1 with respect to the surface A1 of the sheet Sh1. In particular, in the present embodiment, the light irradiation portion 3 is configured to irradiate the identification region R1 with the pattern light P1 obliquely at the predetermined angle θ1 from the downstream side in the conveying direction D1, that is, the front side in the conveying direction of the sheet Sh1. Thus, deformation, distortion, or the like according to the asperities on the surface A1 is likely to appear in the pattern on the identification region R1.

The imaging portion 4 captures an image of the identification region R1 of the surface A1 of the sheet Sh1 as the identification image Im1. Since the image captured by the imaging portion 4 is an image (identification image Im1) of the identification region R1 on which the pattern light P1 is being projected, the light irradiation portion 3 irradiates the identification region R1 with the pattern light P1 at least at the imaging timing of the imaging portion 4. In the present embodiment, as an example, the imaging portion 4 and the light irradiation portion 3 are synchronized with each other, and the light irradiation portion 3 applies the pattern light P1 in accordance with the imaging timing of the imaging portion 4. In other words, the light irradiation portion 3 does not output the pattern light P1 during the period in which the imaging portion 4 does not perform imaging, thereby suppressing unnecessary power consumption in the light irradiation portion 3.

In the present embodiment, as shown in FIG. 3, the imaging portion 4 includes an imaging element 41 and an optical component 42. The imaging element 41 includes an area sensor or a line sensor, and outputs image data of the captured identification image Im1 to the control portion 16 as an electric signal. In the present embodiment, as an example, the imaging portion 4 is an area sensor of a contact image sensor (CIS) system using a complementary metal oxide semiconductor (CMOS) sensor as the imaging element 41. However, the imaging portion 4 is not limited to this example, and may be a sensor of a CCD system using a charge coupled device (CCD) as the imaging element 41, for example.

The optical component 42 includes, for example, an imaging lens, and is disposed between the imaging element 41 and the identification region R1 of the surface A1 of the sheet Sh1. Thus, the light of the identification region R1 enters the imaging element 41 through the optical component 42. In the present embodiment, the imaging element 41 and the optical component 42 are arranged on a perpendicular line of the identification region R1 passing through the center (center of gravity) of the identification region R1. Further, a light receiving surface 411 (see FIG. 3) of the imaging element 41 is arranged parallel to the identification region R1. Therefore, the optical axis Ax2 (see FIG. 3) of the imaging portion 4 is a perpendicular line of the light receiving surface 411 passing through the center (center of gravity) of the light receiving surface 411 of the imaging element 41. The optical axis Ax2 of the imaging portion 4 is also orthogonal to the identification region R1, and intersects the optical axis Ax1 of the light irradiation portion 3 (pattern light P1) at the center of the identification region R1. The area of the identification region R1 captured by the imaging element 41 is equal to a numerical value obtained by dividing the area of the light receiving surface 411 of the imaging element 41 by the image magnification M of the optical component 42. In the present embodiment, the image magnification M is assumed to be "1" for simplicity of explanation. However, the image magnification M may be a value other than 1.

In the present embodiment, as an example, the imaging portion 4 is integrated with the light irradiation portion 3 to form a sensor unit 20 (see FIG. 2). In other words, the sensor unit 20 includes the light irradiation portion 3 and the imaging portion 4. The sensor unit 20 is housed in the housing 100 of the image processing apparatus 10, and is electrically connected to at least the control portion 16.

In the present embodiment, as shown in FIG. 2, the sensor unit 20 including the light irradiation portion 3 and the imaging portion 4 is arranged to face the conveying path T1 between the sheet feed portion 14 and the image forming portion 13. Therefore, the imaging position of the identification region R1 is set on the conveying path T1 between the sheet feed portion 14 and the image forming portion 13. That is, the light irradiation portion 3 and the imaging portion 4 can capture the identification image Im1 by irradiating the sheet Sh1 conveyed from the sheet feed portion 14 to the image forming portion 13 with the pattern light P1 at a position between the sheet feed portion 14 and the image forming portion 13. More specifically, the sensor unit 20 is disposed at a position upstream of the transfer device 131 of the image forming portion 13 and downstream of the merging point of the conveying path T1 connected to the plurality of sheet feed cassettes 141 in the conveying direction D1 of the sheet Sh1. Therefore, the identification image Im1 can be captured by one sensor unit 20 also for the sheets Sh1 supplied to the image forming portion 13 from the plurality of sheet feed cassettes 141, eliminating the need to provide a sensor unit 20 for each sheet feed cassette 141.

The surface A1 of the sheet Sh1 including the identification region R1 is a side where an image is formed by the image forming portion 13 in the thickness direction of the sheet Sh1, as an example in the present embodiment, but is not limited to this example. The identification region R1 may be set, for example, on a side (back side) where an image is not formed by the image forming portion 13 in the thickness direction of the sheet Sh1. In this case, the light irradiation portion 3 and the imaging portion 4 are disposed on the back side of the sheet Sh1. In addition, the identification region R1 may be set, for example, on both sides in the thickness direction of the sheet Sh1. In this case, two sets of the light irradiation portion 3 and the imaging portion 4 may be provided on both sides in the thickness direction of the sheet Sh1, or the sheet Sh1 may be turned over so that the identification images Im1 on both sides of the sheet Sh1 are captured by one set of the light irradiation portion 3 and the imaging portion 4.

The thickness sensor 5 detects a physical quantity relating to the thickness of the sheet Sh1. The thickness sensor 5 outputs the detected physical quantity as an electric signal to the control portion 16. Thus, the control portion 16 can identify the thickness of the sheet Sh1. As an example, the thickness sensor 5 includes an optical sensor that detects the thickness (or basis weight) of the sheet Sh1 using transmitted light. The thickness sensor 5 may be included in the sensor unit 20 or provided separately from the sensor unit 20.

The acquisition portion 21 acquires the identification image Im1 captured by the imaging portion 4. Specifically, the acquisition portion 21 acquires the image data of the identification image Im1 captured by the imaging portion 4 as an electric signal from the imaging element 41 of the imaging portion 4. The acquisition portion 21 controls the light irradiation portion 3 and the imaging portion 4 to cause the light irradiation portion 3 to apply the pattern light P1 and the imaging portion 4 to capture the identification image Im1 in accordance with, for example, the timing when the sheet Sh1 passes a position on the conveying path T1 corresponding to the sensor unit 20. The identification image Im1 acquired by the acquisition portion 21 is temporarily stored in the one or more memories. The acquisition portion 21 may acquire the identification image Im1 from a source other than the imaging portion 4.

The asperity identification portion 22 identifies asperity information on the asperities on the surface A1 of the sheet Sh1 based on the identification image Im1 acquired by the acquisition portion 21. Thus, the state of the asperities on the surface A1 of the sheet Sh1 can be identified. The asperity information includes information on at least one of the dimension of the asperities on the surface A1 in a direction orthogonal to the plane along the surface A1 and the dimension in a direction along the plane. That is, the asperity information includes information on the height (or depth) of the asperities, which is the dimension in the direction orthogonal to the plane along the surface A1 and/or the size of the asperities in plan view, which is the dimension in the direction along the plane. Thus, the height (or depth) of the asperities on the surface A1 of the sheet Sh1 and/or the size of the asperities in plan view can be identified. In the present embodiment, as an example, the asperity identification portion 22 calculates a numerical value corresponding to the arithmetic average height (Sa) of the surface A1 relating to the heights (or depths) of the asperities as the asperity information.

Here, the asperity identification portion 22 identifies the asperity information based on the degree of deformation, distortion, or the like of the pattern light P1 in the identification image Im1. That is, since the identification image Im1 includes a luminance distribution of a pattern corresponding to the pattern light P1, which is produced in the identification region R1 by the projection of the pattern light P1, the pattern is deformed or distorted by the asperities on the surface A1. For example, even when the pattern light P1 forms a linear pattern, the pattern light P1 projected on the surface A1 is deformed (meandered) in accordance with the asperities on the surface A1. Therefore, the asperity identification portion 22 calculates asperity information on the asperities on the surface A1 from the degree of deformation, distortion, or the like of the pattern light P1. In the present embodiment, the asperity identification portion 22 identifies the asperity information based at least on the variation in the line width of the pattern light P1 on the identification region R1. Thus, the state of the asperities on the surface A1 of the sheet Sh1 can be identified by relatively simple arithmetic processing.

The condition determination portion 23 determines image processing conditions based on the asperity information identified by the asperity identification portion 22. The image processing conditions here are conditions relating to image formation or image reading. That is, various image processing conditions including an image forming condition relating to image formation and/or an image reading condition relating to image reading executed in the image processing apparatus 10 are determined by the condition determination portion 23. Specifically, the image processing conditions include, for example, the fixing pressure, the fixing temperature, the conveying speed of the sheet Sh1, the transfer voltage, or the like in the image forming portion 13, as well as the sheet conveying speed, the light intensity, the resolution, or the like in the image reading portion 12. For example, when the arithmetic average height (Sa) of the surface A1 of the sheet Sh1 is larger (i.e., rougher), heat may be more difficult to be transferred at the time of fixing by the image forming portion 13, or the electrical contact resistance may be higher at the time of transferring, so that the current may be more difficult to flow. Therefore, the condition determination portion 23 automatically sets the image processing conditions based on the asperity information so as to increase the fixing temperature, decrease the conveying speed, or increase the transfer voltage when the arithmetic average height (Sa) becomes larger (i.e., rougher). This enables image formation and/or image reading under appropriate image processing conditions according to the asperities on the surface A1 of the sheet Sh1, leading to an improvement in the quality (including image quality) of image formation and/or image reading.

In addition, in the present embodiment, the condition determination portion 23 determines image processing conditions relating to image formation or image reading based on the fiber direction. That is, in the present embodiment, the fiber direction of the surface A1 of the sheet Sh1 is identified by the direction identification portion 24. Therefore, the condition determination portion 23 determines the image processing conditions based on not only the asperity information but also the fiber direction. For example, in the inkjet type image forming portion 13, the curl behavior differs depending on the fiber direction, so that the curl direction may be predicted in accordance with the fiber direction for curl correction. The image processing conditions determined by the condition determination portion 23 based on the fiber direction include a condition for curl correction. In addition, the "skew" in which the long side or the short side of the sheet Sh1 is tilted with respect to the conveying direction can also be estimated from the fiber direction; therefore, the image processing conditions determined by the condition determination portion 23 based on the fiber direction may include a condition for skew correction. This enables image formation and/or image reading under appropriate image processing conditions according to the fiber direction on the surface A1 of the sheet Sh1, leading to an improvement in the quality (including image quality) of image formation and/or image reading.

However, the condition determination portion 23 only has to have a function of determining the image processing conditions based on at least one of the asperity information and the fiber direction. In other words, the condition determination portion 23 determines image processing conditions relating to image formation or image reading based on the surface information (at least one of the asperity information and the fiber direction). That is, the condition determination portion 23 is not necessarily be configured to determine the image processing conditions based on both the asperity information and the fiber direction, and may determine the image processing conditions based on only one of the asperity information and the fiber direction. Further, in the present embodiment, the thickness identification portion 25 identifies the thickness of the sheet Sh1. Therefore, the condition determination portion 23 may determine the image processing conditions based on the thickness of the sheet Sh1 in addition to or instead of at least one of the asperity information and the fiber direction.

The direction identification portion 24 identifies the fiber direction of the surface A1 of the sheet Sh1 based on the identification image Im1. Here, the direction identification portion 24 identifies the fiber direction based on the deformation, distortion, or the like of the pattern light P1 in the identification image Im1. That is, depending on the line width of the pattern light P1 on the identification region R1, the degree of deformation, distortion, or the like of the pattern light P1 caused by the asperities on the surface A1 varies in accordance with the relationship between the extending direction of the pattern light P1 and the fiber direction. Therefore, in the present embodiment, the direction identification portion 24 identifies the fiber direction based at least on the variation in the line width of the pattern light P1 on the identification region R1. Thus, the fiber direction of the surface A1 of the sheet Sh1 can be identified by relatively simple arithmetic processing.

The thickness identification portion 25 identifies the thickness of the sheet Sh1 based on the output of the thickness sensor 5. That is, the thickness identification portion 25 receives an electric signal representing a physical quantity relating to the thickness of the sheet Sh1 from the thickness sensor 5, and calculates the thickness of the sheet Sh1. Since the sheet identification device 2 according to the present embodiment includes the thickness identification portion 25, it can estimate the type (paper type) of the sheet Sh1 based on not only the state of the surface A1 of the sheet Sh1 but also the thickness thereof.

[4] Sheet Identification Method

Next, a sheet identification method according to the present embodiment, i.e., the operation of the sheet identification device 2 will be described with reference to FIG. 5 to FIG. 7.

[4.1] Principle

First, the principle of the asperity identification portion 22 identifying the asperity information based on the identification image Im1 will be described with reference to FIG. 5 and FIG. 6. In FIG. 5, the bright portions L1 of the pattern light P1 are schematically indicated by dotted lines, and the dark portions L2 are schematically indicated by dash-dot-dot-dash lines.

As shown as "CONVEX PORTION 1" in the upper part of FIG. 5, it is assumed that there is a rectangular parallelepiped convex portion A11 having a height $\Delta Z$ from the surface A1 on the surface A1 of the sheet Sh1. Here, the pattern light P1 is obliquely incident on the surface A1 of the sheet Sh1 at the predetermined angle $\theta 1$. Therefore, the pattern light P1 is projected on the same plane as the surface A1 except at the convex portion A11, and projected frontward by the height $\Delta Z$ at the convex portion A11 than on the surface A1, so that the projection position of the pattern light P1 is shifted only at the convex portion A11 when viewed from the perpendicular direction of the surface A1. That is, the pattern light P1 (the bright portions L1 and the dark portions L2) of a portion provided with the convex portion A11 in the identification image Im1 captured by the imaging portion 4 is shifted from the original projection position on the surface A1 by the shift amount $\Delta X$ represented by the following Equation 1:

$$\Delta X = \Delta Z / \tan\theta 1 \qquad \text{(Equation 1)}$$

Since the predetermined angle $\theta 1$ is known, when the shift amount $\Delta X$ is obtained from the identification image Im1, the height $\Delta Z$ of the convex portion A11 can be calculated from the shift amount $\Delta X$ and the Equation 1. Then, the asperity information of the entire identification region R1 can be obtained from the shift amounts $\Delta X$ of the entire identification region R1. The asperity information calculated in this way has a correlation with the arithmetic average height (Sa) of the surface A1.

In addition, as shown as "CONVEX PORTION 2" in the lower part of FIG. 5, even when where is a triangular prism-shaped convex portion A12 whose height $\Delta Z$ from the surface A1 varies from part to part on the surface A1 of the sheet Sh1, the heights $\Delta Z$ of the respective parts of the convex portion A12 can be calculated. That is, similarly to the above example, by obtaining the shift amounts $\Delta X$ from the identification image Im1, the heights $\Delta Z$ of the convex portion A12 can be calculated from the above Equation 1. Therefore, for example, as in the case of the paper sheet Sh1, the asperity information can also be calculated for the asperities caused by the undulation component generated by continuous entanglement of many fibers.

By the way, in the method for obtaining the roughness of the surface A1 from the shadow image caused by the asperities as in the above-described related technique, for example, in the case of the paper sheet Sh1, the local fiber asperities are strongly reflected in the calculation result, so that the calculation result does not necessarily have a linear relationship with the arithmetic average height (Sa). Therefore, in the above-described method of the related technique, it is difficult to determine from the calculation result the magnitude of the surface roughness of the sheet Sh1 of the same type (for example, plain paper), although it may be possible to discriminate between glossy paper with a high flatness (gloss paper) and plain paper, for example. Therefore, in the above-described method of the related technique, in order to determine the magnitude of the surface roughness, it is necessary to prepare in advance, for example, a table (database) in which the calculation results of various sheets Sh1 are associated with arithmetic average heights (Sa).

In contrast, in the sheet identification device 2 according to the present embodiment, by optimizing the line width, the predetermined angle $\theta 1$, and the like of the pattern light P1, the asperity information having a high linearity with the arithmetic average height (Sa) can be calculated while also reducing the influence of local fibers. Therefore, according to the method of the present embodiment, it is possible to uniquely obtain an arithmetic average height (Sa) from the calculation result of the asperity identification portion 22 without preparing in advance the table (database) in which the calculation results (asperity information) are associated with arithmetic average heights (Sa).

FIG. 6 shows an example of the identification image Im1 obtained by the sheet identification device 2 according to the present embodiment. Here, as the imaging conditions of the identification image Im1, lit is assumed that the predetermined angle $\theta 1$ is 40 degrees, the resolution (number of pixels) of the imaging element 41 is 100×100, the line width W1 (see FIG. 4) of the bright portion L1 of the stripe pattern produced by the pattern light P1 is 120 μm, and the line width W2 (see FIG. 4) of the dark portion L2 is 120 μm. Further, it is assumed that the image magnification M is "1", and the irradiation direction of the pattern light P1, that is, the arrangement direction of the bright portions L1 and the dark portions L2 is the same as the fiber direction.

The identification image Im1 is composed of a plurality of pixels, and each of the plurality of pixels has a pixel value corresponding to luminance. In the present embodiment, as an example, the relationship between the luminance and the pixel value is defined such that the higher the luminance, the larger the pixel value. Therefore, in the identification image Im1 obtained by capturing the identification region R1 on which the pattern light P1 is projected, the pixel values of the pixels corresponding to the bright portion L1 are relatively large values, and the pixel values of the pixels corresponding to the dark portion L2 are relatively small values.

The upper part ("Sa: SMALL") of FIG. 6 shows a identification image Im1 when the pattern light P1 is projected on an identification region R1 of glossy paper (gloss paper) having a small arithmetic average height (Sa), that is, having a high flatness. On the other hand, the lower part ("Sa: LARGE") of FIG. 6 shows an identification image Im1 when the pattern light P1 is projected on an identification region R1 of plain paper (Sa=6 μm) having a large arithmetic average height (Sa), that is, having a low flatness. As shown in FIG. 6, as the arithmetic average height (Sa) increases, the deformation and distortion of the stripe pattern produced by the pattern light P1 in the identification image Im1 increase. Specifically, when the deformation and distortion of the stripe pattern increase, the boundary line between the bright portion L1 and the dark portion L2 of the stripe pattern is distorted, and the variation in the line width of each of the bright portion L1 and the dark portion L2 increases. That is, as the arithmetic average height (Sa) increases, the undulation component of the height of the surface A1 increases, so that the variation in the line width of each of the bright portion L1 and the dark portion L2 increases. As described above, in FIG. 6, it is apparent that, deformation, distortion, or the like occurs in the stripe pattern produced by the pattern light P1 in the identification image Im1, in accordance with the asperities on the surface A1.

[4.2] Specific Processing

Next, specific processing for identifying the asperity information based on the identification image Im1 by the asperity identification portion 22 will be described with reference to FIG. 7. Steps S1, S2, . . . in the flowchart shown in FIG. 7 represent the numbers of the processing procedure (steps) executed by the control portion 16. The processing to be described below is started in accordance with the timing at which the sheet Sh1 passes the position (monitor position) corresponding to the sensor unit 20 of the conveying path T1, for example.

When the purpose is to restore a three-dimensional shape, the analysis of the identification image Im1 including the pattern light P1 can be realized by, for example, a method of continuously projecting a plurality of pattern lights P1 and using a Fourier transform or the like of the identification images Im1 to calculate a phase change of the pattern light P1. However, this method has a relatively high calculation load, takes a relatively long time to calculate the roughness (asperity information) of the surface A1, and also requires relatively high hardware (CPU, GPU, memory, etc.) costs. Therefore, in the present embodiment, instead of the above-described method, the following method is adopted so that the roughness (asperity information) of the surface A1 can be calculated by relatively simple arithmetic processing.

That is, in the present embodiment, the asperity identification portion 22 calculates the width (line width) of at least one of the bright portions L1 and the dark portions L2 for each row (each line) of the identification image Im1, with the arrangement direction (left-right direction in FIG. 6) of the bright portions L1 and the dark portions L2 in the identification image Im1 as a "row direction". That is, the identification image Im1 is an "N pixels×M rows" image in which N pixels are arranged in the arrangement direction of the bright portions L1 and the dark portions L2, and the asperity identification portion 22 calculates the line width of each row of the M rows included in the identification image Im1. The asperity identification portion 22 obtains the line width of at least one of the bright portion L1 and the dark portion L2 calculated for each row as described above for the entire identification image Im1, and calculates the magnitude of the variation in the line width in the identification image Im1 as the asperity information. Thus, the asperity identification portion 22 can obtain asperity information having a correlation with the arithmetic average height (Sa) of the surface A1, based on the variation in the line width of the pattern light P1.

<Step S1>

Specifically, in step S1, the control portion 16 determines whether the sheet Sh1 has reached the monitor position, that is, the position corresponding to the sensor unit 20 on the conveying path T1. When the sheet feed portion 14 supplies the sheet Sh1 to the image forming portion 13, the control portion 16 determines that the sheet Sh1 has reached the monitor position when the sheet Sh1 is detected by a sensor at the monitor position (S1: Yes), and shifts the processing to step S2. On the other hand, if the sheet Sh1 is not detected by the sensor at the monitor position, the control portion 16 determines that the sheet Sh1 has not reached the monitor position (S1: No), and shifts the processing to step S1.

<Steps S2 and S3>

In step S2, the control portion 16 controls, at the acquisition portion 21, the light irradiation portion 3 to cause the light irradiation portion 3 to apply the pattern light P1. Thus, the pattern light P1 is projected on the identification region R1 of the surface A1 of the sheet Sh1. In step S3, the control portion 16 controls, at the acquisition portion 21, the imaging portion 4 to cause the imaging portion 4 to image the identification region R1 on which the pattern light P1 is being projected. Thus, an identification image Im1, which is an image of the identification region R1 of the surface A1 of the sheet Sh1, is generated by the imaging portion 4.

<Step S4>

In step S4, the control portion 16 acquires, at the acquisition portion 21, an image of one row (one line) of the identification image Im1 from the imaging portion 4. That is, the acquisition portion 21 acquires one row of the identification image Im1 corresponding to one pixel in the column direction. Since the imaging portion 4 (imaging element 41) is generally designed to sequentially read out an image for each row, the amount of memory used can be kept low by acquiring and analyzing (steps S5 and S6) the identification image Im1 for each row in this manner.

<Step S5>

In step S5, the control portion 16 executes, at the acquisition portion 21, preprocessing on the identification image Im1. At this time, one row (one line) of the identification image Im1 acquired in step S4 is subjected to the preprocessing. That is, the control portion 16 executes the preprocessing on the identification image Im1 row by row. The preprocessing includes, for example, filtering processing and binarization processing. Specifically, the control portion 16 performs noise removal or the like in the filtering processing and further performs binarization with a reference value for one row of the identification image Im1.

The reference value used in the binarization processing is, for example, an average value of a plurality of pixels, a value determined in advance (predetermined value), or the like. The pixels corresponding to the bright portions L1 become "white pixels" as pixels having pixel values equal to or greater than the reference value, and the pixels corresponding to the dark portions L2 become "black pixels" as pixels having pixel values less than the reference value. The preprocessing may include trimming processing for cutting out only a part of the identification image Im1 to narrow down the area to be processed in step S6. In addition, the filtering processing and the like are not essential, and may be omitted as appropriate.

<Step S6>

In step S6, the control portion 16 extracts, at the asperity identification portion 22, width data indicating the width (line width) of at least one of the bright portion L1 and the dark portion L2 from the identification image Im1. At this time, the width data is extracted from one row (one line) of the identification image Im1 acquired in step S4. That is, the control portion 16 executes extraction of width data on the identification image Im1 row by row. Specifically, the control portion 16 calculates, as the width data, the number of white pixels corresponding to the bright portions L1 and the number of black pixels corresponding to the dark portions L2 in one row of the identification image Im1. At this time, the control portion 16 extracts the number of white pixels and the number of black pixels throughout one row of the identification image Im1, thereby extracting the sum of the line widths of the plurality of bright portions L1 and the sum of the line widths of the plurality of dark portions L2.

In the present embodiment, as an example, both the number of white pixels corresponding to the line widths of the bright portions L1 and the number of black pixels corresponding to the line widths of the dark portions L2 are used as the width data, but the present disclosure is not limited to this example, and only the number of pixels of either the bright portions L1 or the dark portions L2 may be used as the width data. That is, the control portion 16 may identify the asperity information by focusing on the line widths of either the bright portions L1 or the dark portions L2. In addition, the control portion 16 may extract the line width of each bright portion L1 and that of each dark portion L2 by extracting the number of white pixels consecutive in the row direction and the number of black pixels consecutive in the row direction. In this case, the control portion 16 may use the line width of each of the plurality of bright portions L1 (or dark portions L2) as the width data, or may use a representative value (for example, an average value, a mode value, a median value, or the like) of the line widths of the plurality of bright portions L1 (or dark portions L2) as the width data.

<Step S7>

In step S7, the control portion 16 determines whether or not processing has been completed to the last one row of the identification image Im1. That is, with respect to the "N pixels×M rows" identification image Im1, if the processing target is the M-th row which is the last row, the control portion 16 determines that the processing has been completed to the last row (S7: Yes), and shifts the processing to step S8. On the other hand, if the processing target is not the M-th row which is the last row, the control portion 16 determines that the processing has not been completed to the last row (S7: No), and shifts the processing to step S4 to acquire the next one row of the identification image Im1.

<Step S8>

In step S8, the control portion 16 calculates, at the asperity identification portion 22, the standard deviation σ of the width data of the M rows of the identification image Im1. As the arithmetic average height (Sa) increases, the undulation component of the height of the surface A1 increases, so that the variation in the line width of each of the bright portion L1 and the dark portion L2 increases (see FIG. 6), and the standard deviation σ increases. That is, the asperity identification portion 22 calculates the standard deviation σ as the asperity information.

<Step S9>

In step S9, the control portion 16 determines, at the condition determination portion 23, image processing conditions. That is, the condition determination portion 23 determines the image processing conditions including image forming conditions in accordance with the standard deviation σ calculated in step S8. As an example, when the standard deviation σ increases, the condition determination portion 23 sets the image forming conditions so as to increase the fixing temperature, decrease the conveying speed, or increase the transfer voltage. Thus, when an image is formed on the sheet Sh1 by the image forming portion 13, the image forming conditions corresponding to the asperities on the surface A1 of the sheet Sh1 are automatically applied.

Figure 7:
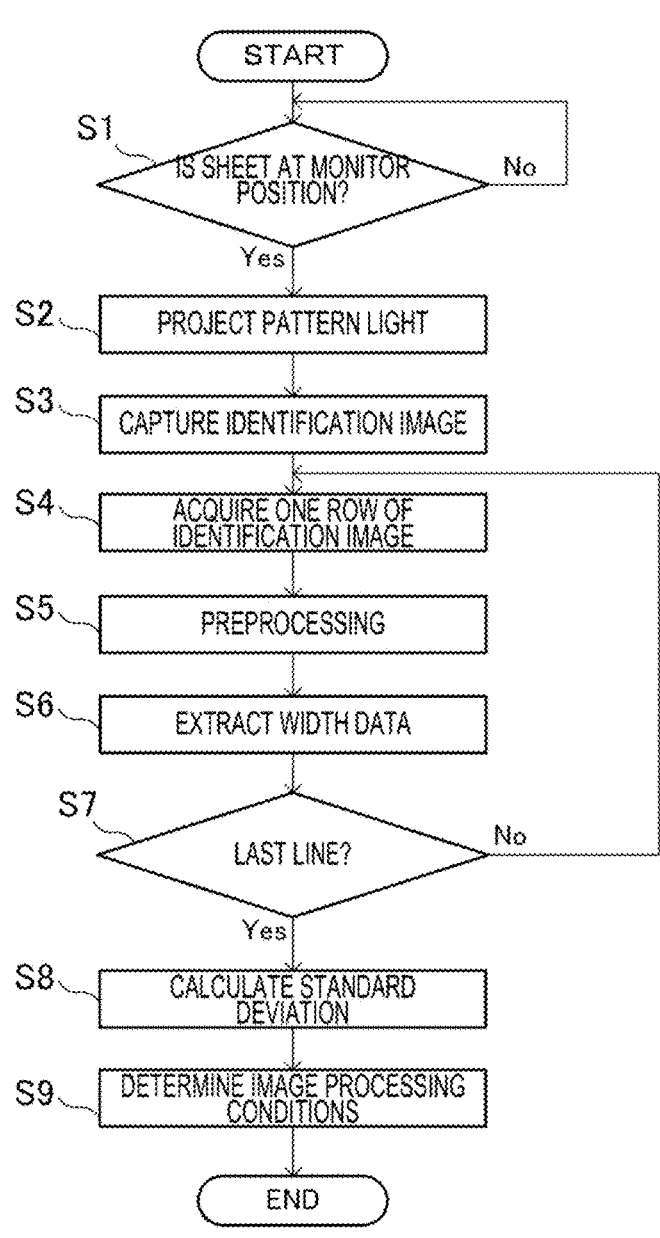
FIG. 7 is a flowchart of an example operation of the sheet identification device according to the first embodiment.

The procedure of the sheet identification method described above is merely an example, and the order of the processes shown in the flowchart of FIG. 7 may be changed as appropriate.

[5] Irradiation Angle

Next, the irradiation angle of the pattern light P1 will be described with reference to FIG. 8, which shows examples of the identification image Im1 when the predetermined angle θ1 is changed. In FIG. 8, as the imaging conditions of the identification image Im1, it is assumed that the arithmetic average height (Sa) of the identification region R1 is 6 μm, the resolution (number of pixels) of the imaging element 41 is 100×100, the line width W1 of the bright portion L1 of the stripe pattern produced by the pattern light P1 is 100 μm, and the line width W2 of the dark portion L2 is 100 μm. Further, it is assumed that the irradiation direction of the pattern light P1, that is, the arrangement direction of the bright portion L1 and the dark portion L2 is the same as the fiber direction.

The optical axis Ax1 of the pattern light P1 is inclined at the predetermined angle θ1 with respect to the surface A1 of the sheet Sh1 (see FIG. 3). Here, the predetermined angle θ1 has a great influence on the brightness of the identification image Im1. In the method for obtaining the roughness of the surface A1 from the shadow image caused by the asperities as in the related technique described above, the irradiation angle (corresponding to the predetermined angle θ1) of the light with respect to the surface A1 of the sheet Sh1 is set relatively shallow (small) in order to capture the asperities on the order of several micrometers as a shadow image. In particular, in order to increase the sensitivity to asperities, the irradiation angle is set at a very shallow angle of about 10 degrees. However, at very small irradiation angles, sufficient light does not reach the imaging portion 4, and the identification image Im1 becomes a relatively dark image, so that a relatively expensive high-sensitivity imaging element 41 is required to obtain the roughness of the surface A1 from the dark image.

In contrast, in the sheet identification device 2 according to the present embodiment, the roughness of the surface A1 is obtained from the degree of deformation, distortion, or the like of the pattern light P1 in the identification image Im1; therefore, it is sufficient that deformation, distortion, or the like of the pattern light P1 is caused by asperities. Therefore, in the present embodiment, the predetermined angle θ1 can be set larger than in the method of the related technique described above, and a bright image can be realized as the identification image Im1. Therefore, the roughness of the surface A1 can be obtained from the identification image Im1 even with a relatively inexpensive imaging element 41.

Rather, in the configuration of the present embodiment, as shown in FIG. 8, when the predetermined angle θ1 becomes small, the shape of the pattern light P1 projected on the identification region R1 collapses, and the boundary between the bright portion L1 and the dark portion L2 of the stripe pattern becomes ambiguous. That is, as is clear from FIG. 8, the shape of the pattern light P1 collapses more when the predetermined angle θ1 is 30 degrees than when it is 40 degrees, when the predetermined angle θ1 becomes 20 degrees, the shape of the pattern light P1 collapses further, and when the predetermined angle θ1 becomes 10 degrees, the shape of the pattern light P1 collapses even further. From the identification image Im1 of the pattern light P1 whose shape has been collapsed as described above, it is difficult to extract deformation, distortion, or the like of the pattern light P1 caused by asperities. The inventors have verified various predetermined angles θ1, and have found that the predetermined angle θ1 is preferably 20 degrees or more when the sheet Sh1 having an arithmetic average height (Sa) of the surface A1 of about several micrometers is the target.

In short, in consideration of the brightness of the identification image Im1, the predetermined angle θ1 is preferably 10 degrees or more, and more preferably 15 degrees or more. Further, in the present embodiment, the predetermined angle θ1 is set at 20 degrees or more so that the shape of the pattern light P1 is not too deformed. That is, the predetermined angle θ1 is 20 degrees or more and 90 degrees or less. Here, the lower limit value of the predetermined angle θ1 is not limited to 20 degrees, and may be, for example, 25 degrees, 30 degrees, 35 degrees, 40 degrees, 45 degrees, 50 degrees, 55 degrees, 60 degrees, 65 degrees, 70 degrees, 75 degrees, or 80 degrees. Also, the upper limit value of the predetermined angle θ1 is not limited to 90 degrees, and may be, for example, 85 degrees, 80 degrees, 75 degrees, 70 degrees, 65 degrees, 60 degrees, 55 degrees, 50 degrees, or 45 degrees.

Since the difference between 90 degrees and the predetermined angle θ1 corresponds to the "incident angle" which is the angle between the pattern light P1 and the perpendicular line of the surface A1, the "incident angle" of the pattern light P1 when the predetermined angle θ1 is 20 degrees is 70 degrees (=90 degrees-20 degrees). On the other hand, when the predetermined angle is 90 degrees, the incident angle of the pattern light P1 is 0 degrees.

[6] Line Width

Figure 9:
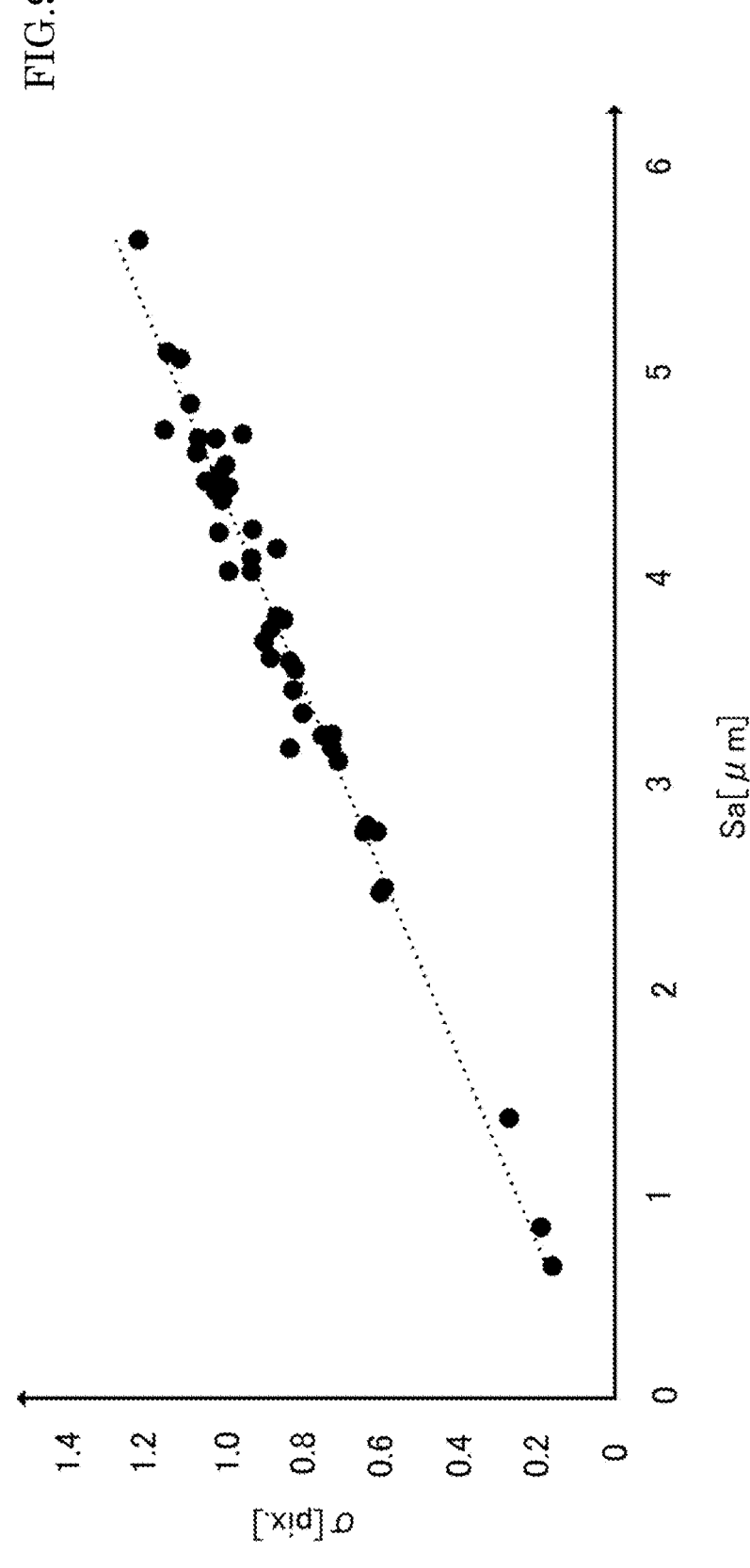
FIG. 9 is a graph showing the relationship between the arithmetic average height and the standard deviation obtained in the sheet identification device according to the first embodiment.

Next, the line width of the pattern light P1 will be described later with reference to FIG. 9 and FIG. 10. FIG. 9 is a graph showing the relationship between the standard deviation σ as the asperity information calculated in accordance with the flowchart of FIG. 7 and the actual arithmetic average height Sa for 48 types of sheets Sh1. In FIG. 9, the horizontal axis represents the arithmetic average height Sa, and the vertical axis represents the standard deviation σ (the standard deviation σ is an average value of five locations in the bright portion L1 or the dark portion L2). In FIG. 9, as the imaging conditions of the identification image Im1, it is assumed that the resolution (number of pixels) of the imaging element 41 is 100×100, the line width W1 of the bright portion L1 of the stripe pattern produced by the pattern light P1 is 80 μm, and the line width W2 of the dark portion L2 is 80 μm. Further, it is assumed that the irradiation direction of the pattern light P1, that is, the arrangement direction of the bright portion L1 and the dark portion L2 is the same as the fiber direction.

In the example of FIG. 9, the determination coefficient R2 of the linear regression model of the arithmetic average height Sa and the standard deviation σ is "0.9684", which confirms a high linearity between the standard deviation σ as the asperity information and the arithmetic average height Sa.

On the other hand, FIG. 10 shows the results of calculating the determination coefficient R2 while changing the line width of the pattern light P1 and the relationship between the irradiation direction of the pattern light P1 and the fiber direction. In FIG. 10, as the imaging conditions of the identification image Im1, it is assumed that the predetermined angle θ1 is 40 degrees and the resolution (number of pixels) of the imaging element 41 is 100×100. Under the conditions, the line width W1 of the bright portion L1 and the line width W2 of the dark portion L2 of the stripe pattern produced by the pattern light P1 are changed in the range of 40 μm to 200 μm, and the relationship between the irradiation direction of the pattern light P1 and the fiber direction is changed between "the same" (that is, parallel) and "90°" (that is, orthogonal).

According to FIG. 10, it is presumed that the influence of the relationship between the irradiation direction of the pattern light P1 and the fiber direction on the standard deviation σ as the asperity information varies depending on the line width of the pattern light P1. That is, in FIG. 10, it can be confirmed that the smaller (thinner) the line width of the pattern light P1, the greater the influence of the relationship between the irradiation direction of the pattern light P1 and the fiber direction on the standard deviation σ as the asperity information. It is considered that this is because the width of the fiber of the sheet Sh1 is several tens of micrometers or less, and the line width of the pattern light P1 approaches the fiber width, which makes the local undulation component of the height of the surface A1 likely to occur as the variation in the line width of each of the bright portion L1 and the dark portion L2.

When the line width of the pattern light P1 is 100 μm or more, the determination coefficient R2 is "0.85" or more regardless of the relationship between the irradiation direction of the pattern light P1 and the fiber direction. Therefore, when the line width of the pattern light P1 is 100 μm or more, the influence of the relationship between the irradiation direction of the pattern light P1 and the fiber direction on the standard deviation σ as the asperity information is relatively small, and the relationship between the irradiation direction of the pattern light P1 and the fiber direction is negligible. In short, whether the relationship between the irradiation direction of the pattern light P1 and the fiber direction affects the asperity information is determined depending on whether the line width W1 of the bright portion L1 and the line width W2 of the dark portion L2 of the stripe pattern produced by the pattern light P1 are 100 μm or more, or less than 100 μm. Namely, when the line width is 100 μm or more, the relationship between the irradiation direction and the fiber direction hardly affects the asperity information, so that the calculated asperity information can be regarded as "independent of the fiber direction". On the other hand, when the line width is less than 100 μm, the relationship between the irradiation direction and the fiber direction is likely to affect the asperity information, so that the calculated asperity information can be regarded as "dependent on the fiber direction".

As described above, even in the sheet identification device 2 according to the present embodiment, the relationship between the irradiation direction of the pattern light P1 and the fiber direction may affect the standard deviation σ as the asperity information, depending on the line width of the pattern light P1. By making the line width of the pattern light P1 relatively larger than the width of the fiber of the sheet Sh1, the influence can be reduced, which causes a high linearity between the standard deviation σ as the asperity information and the arithmetic average height Sa.

From the above, in the present embodiment, the width of at least one of the bright portion L1 and the dark portion L2 is preferably 60 µm or more and 500 µm or less. Furthermore, in order to make the asperity information less susceptible to the relationship between the irradiation direction of the pattern light P1 and the fiber direction, it is preferable that at least one of the line width W1 of the bright portion L1 and the line width W2 of the dark portion L2 of the stripe pattern produced by the pattern light P1 is 100 µm or more. Conversely, in order to make the asperity information more susceptible to the relationship between the irradiation direction of the pattern light P1 and the fiber direction, it is preferable that at least one of the line width W1 of the bright portion L1 and the line width W2 of the dark portion L2 of the stripe pattern produced by the pattern light P1 is less than 100 µm. Here, the lower limit value of the width of at least one of the bright portion L1 and the dark portion L2 is not limited to 60 µm, and may be, for example, 65 µm, 70 µm, 75 µm, 80 µm, 85 µm, 90 µm, or 95 µm. Also, the upper limit value of the width of at least one of the bright portion L1 and the dark portion L2 is not limited to 500 µm, and may be, for example, 450 µm, 400 µm, 350 µm, 300 µm, 250 µm, 200 µm, 180 µm, 160 µm, 140 µm, or 120 µm.

[7] Operation Modes

The sheet identification device 2 according to the present embodiment identifies surface information on the state of the surface A1 of the sheet Sh1 based on the identification image Im1, and the surface information is at least one of the asperity information and the fiber direction. In the present embodiment, the sheet identification device 2 has a plurality of operation modes, and can switch the surface information to be identified, depending on the operation mode. Specifically, the sheet identification device 2 has three operation modes: an asperity identification mode, a fiber direction identification mode, and an all identification mode. The asperity identification mode is an operation mode in which only the asperity information is identified as surface information among the asperity information and the fiber direction. The fiber direction identification mode is an operation mode in which only the fiber direction information is identified as the surface information among the asperity information and the fiber direction. The all identification mode is an operation mode in which both the asperity information and the fiber direction are identified as the surface information.

These operation modes may be switched in response to a user's operation or may be switched automatically. Hereinafter, the configuration and operation of the sheet identification device 2 in each of the asperity identification mode, the fiber direction identification mode, and the all identification mode will be described in order.

[7.1] Asperity Identification Mode

In the asperity identification mode, the sheet identification device 2 identifies the asperity information at the asperity identification portion 22. In the asperity identification mode, since the direction identification portion 24 does not identify the fiber direction, the function of the direction identification portion 24 may be disabled. Furthermore, if the sheet identification device 2 operates only in the asperity identification mode, the direction identification portion 24 can be omitted.

In the asperity identification mode, when the asperity identification portion 22 identifies the asperity information from the identification image Im1, it is preferable to suppress the variation in the detection accuracy depending on the fiber direction. Namely, as described above, the relationship between the irradiation direction of the pattern light P1 and the fiber direction may affect the standard deviation σ as the asperity information. That is, even when the actual arithmetic average height Sa is the same, the magnitude of the variation in the line width of each of the bright portion L1 and the dark portion L2 may change depending on the fiber direction of the asperities of the surface A1 of the sheet Sh1, and the detection accuracy of the asperity information may decrease. As one means for suppressing such a variation in the detection accuracy depending on the fiber direction, as described in the section of "[6] Line Width", it is conceivable to set at least one of the line width W1 of the bright portion L1 and the line width W2 of the dark portion L2 of the stripe pattern produced by the pattern light P1 to 100 µm or more. Thus, since the asperity information calculated from the pattern light P1 in the identification image Im1 can be regarded as "independent of the fiber direction", it is possible to suppress a decrease in the detection accuracy of the asperity information.

Figure 11:
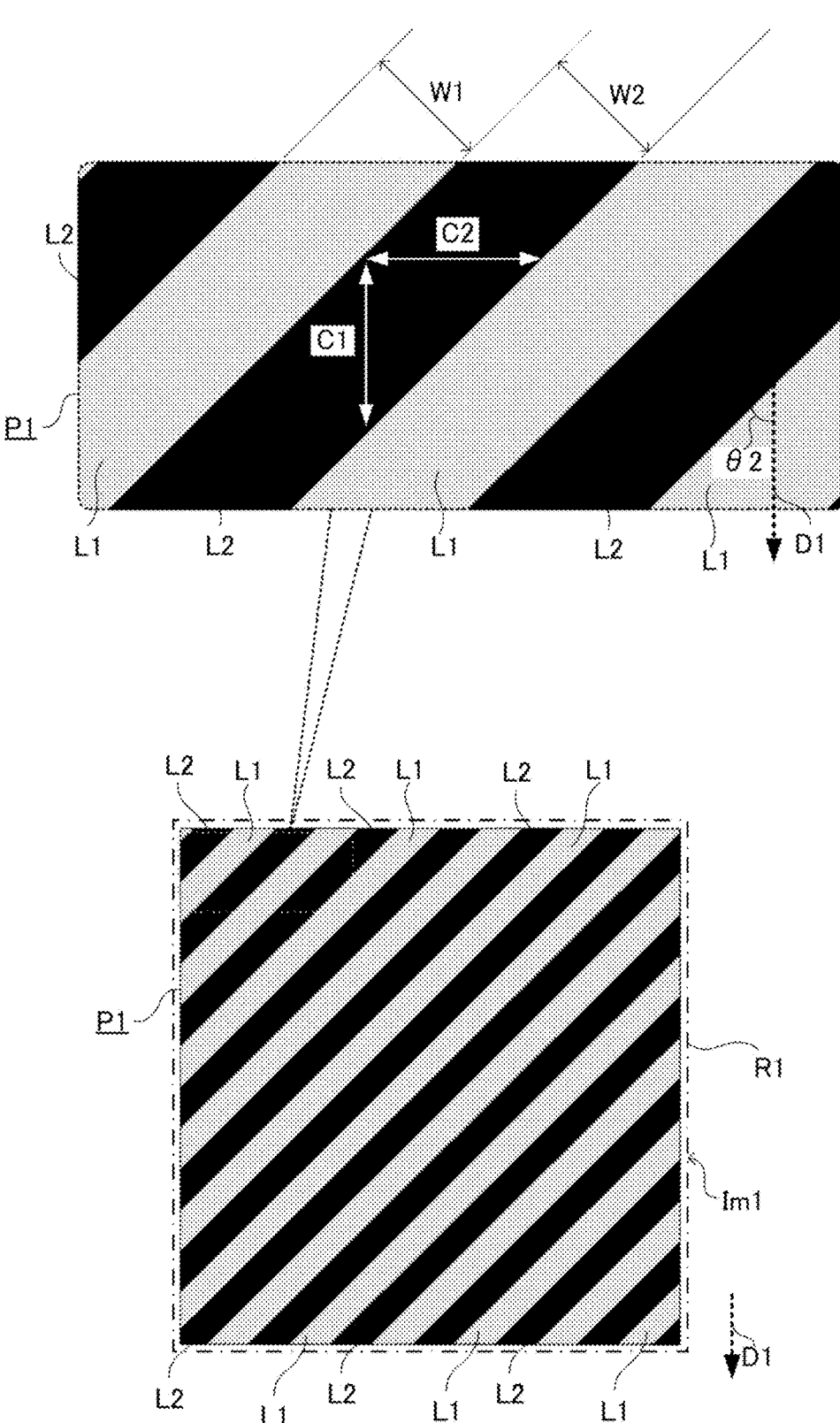
FIG. 11 is a schematic diagram showing pattern light which produces a lattice pattern in the sheet identification device according to the first embodiment.

In addition to setting the line width to 100 µm or more, as means for suppressing the variation in the detection accuracy depending on the fiber direction, it is conceivable to employ pattern light P1 including both the vertical component C1 and the horizontal component C2 as shown in FIG. 11. Here, as an example, it is assumed that the line width W1 of the bright portion L1 of the stripe pattern produced by the pattern light P1 is 80 µm, and the line width W2 of the dark portion L2 is 80 µm. That is, the line width of the pattern light P1 on the identification region R1 is less than 100 µm. That is, use of the pattern light P1 as shown in FIG. 11 suppresses the variation in the detection accuracy depending on the fiber direction by means other than making the line width independent of the fiber direction, so that a line width "dependent on the fiber direction" such as less than 100 µm can be used.

The pattern light P1 shown in FIG. 11 includes the vertical component C1 along the conveying direction D1 of the sheet Sh1 and the horizontal component C2 orthogonal to the vertical component C1. That is, when the light irradiation portion 3 projects the pattern light P1 on the identification region R1, a luminance distribution of a stripe pattern including the bright portion L1 and the dark portion L2 as shown in FIG. 11 is produced on the identification region R1. In the example of FIG. 11, the bright portion L1 and the dark portion L2 both form an oblique stripe pattern inclined by an inclination angle θ2 with respect to the conveying direction D1 of the sheet Sh1. As described above, in the stripe pattern inclined with respect to the conveying direction D1, each of the linear bright portion L1 and the linear dark portion L2 includes both the vertical component C1 extending in a direction along the conveying direction D1 and the horizontal component C2 extending in a direction orthogonal to the conveying direction D1. In short, as shown in FIG. 11, the vector along the bright portion L1 or the dark portion L2 inclined with respect to the conveying direction D1 can be decomposed into the vertical component C1 and the horizontal component C2. In other words, a vector along the bright portion L1 or the dark portion L2 is obtained by combining the vertical component C1 and the horizontal component C2.

On the other hand, the pattern light P1 as shown in FIG. 4 has only a line segment extending in the conveying direction D1 or in a direction orthogonal to the conveying direction D1, in other words, has only one of the vertical component C1 and the horizontal component C2. In particular, the pattern light P1 of FIG. 4 includes only the "horizontal component C2" orthogonal to the conveying direction D1.

In this way, by using the pattern light P1 including both the vertical component C1 and the horizontal component C2, it is possible to suppress the variation in the detection accuracy depending on the fiber direction when identifying the asperity information from the identification image Im1. That is, generally, the sheet Sh1 has a "long grain" in which the fiber direction is along the long side of the sheet Sh1, and a "short grain" in which the fiber direction is along the short side of the sheet Sh1; therefore, the fiber direction is along the conveying direction D1 of the sheet Sh1 or along the direction orthogonal to the conveying direction D1. When the pattern light P1 includes both the vertical component C1 and the horizontal component C2, the fiber direction affects the variation in the line width of the pattern light P1 in both "long grain" and "short grain" cases.

Specifically, when the fiber direction is parallel to the vertical component C1, the variation in the line width of the vertical component C1 becomes small, and the asperities on the surface A1 are not sufficiently reflected in the variation in the line width of the vertical component C1. At this time, the fiber direction is orthogonal to the horizontal component C2; therefore, the variation in the line width of the horizontal component C2 becomes large, and the asperities on the surface A1 are reflected in the variation in the line width of the horizontal component C2. On the contrary, when the fiber direction is orthogonal to the vertical component C1, the variation in the line width of the vertical component C1 becomes large, and the asperities on the surface A1 are reflected in the variation in the line width of the vertical component C1. At this time, the fiber direction is parallel to the horizontal component C2; therefore, the variation in the line width of the horizontal component C2 becomes small, and the asperities on the surface A1 are not sufficiently reflected in the variation in the line width of the horizontal component C2. Therefore, according to the pattern light P1 including both the vertical component C1 and the horizontal component C2, the fiber direction hardly affects the variation in the line width of one of the vertical component C1 and the horizontal component C2, in both "long grain" and "short grain" cases. Therefore, it is possible to identify the asperity information from the identification image Im1 while suppressing the variation in the detection accuracy depending on the fiber direction by at least one of the vertical component C1 and the horizontal component C2.

In particular, in the case of the pattern light P1 illustrated in FIG. 11, the inclination angle θ2 is 45 degrees. That is, the pattern light P1 forms, in the identification region R1, a stripe pattern which is inclined at an angle of 45 degrees with respect to the conveying direction D1 of the sheet Sh1 and in which the bright portion L1 and the dark portion L2 are alternately arranged on the identification region R1. In other words, both the bright portion L1 and the dark portion L2 form a linear pattern inclined at an angle of 45 degrees with respect to the conveying direction D1. With such pattern light inclined at an angle of 45 degrees as described above, the fiber direction can equally affect the variation in the line width of the pattern light P1 in both "long grain" and "short grain" cases. As a result, highly accurate identification of asperity information, which is independent of the fiber direction, is possible.

That is, when the inclination angle θ2 is 45 degrees, the pattern light P1 equally includes the vertical component C1 and the horizontal component C2. Since the vertical component C1 and the horizontal component C2 are equally included, the fiber direction equally affects the variations in the line widths of the vertical component C1 and the horizontal component C2, in both "long grain" and "short grain" cases. Therefore, it is possible to identify the asperity information from the identification image Im1 while suppressing the variation in the detection accuracy depending on the fiber direction by both the vertical component C1 and the horizontal component C2.

The pattern light P1 shown in FIG. 11 can be realized, for example, by slanting the orientation of the slits 321 (see FIG. 4) of the shield 32 (see FIG. 4) with respect to the conveying direction D1. Therefore, it is possible to switch from the pattern light P1 shown in FIG. 4 to the pattern light P1 shown in FIG. 11 without changing the arrangement of the light irradiation portion 3. In short, in the case of the pattern light P1, the pattern light P1 including the vertical component C1 and the horizontal component C2 can be realized depending on the orientation and shape of the pattern in the pattern light P1. Therefore, in the present embodiment, as compared with the configuration in which the incident direction of the light from the light emitting element is inclined at 45 degrees with respect to the conveying direction of the sheet as in the related technique described above, there are fewer restrictions on the arrangement of the light irradiation portion 3, and the degree of freedom in the arrangement of the light irradiation portion 3 is improved.

In the case of the pattern light P1 shown in FIG. 11 as described above, the stripe patterns of the bright portion L1 and the dark portion L2 formed by the pattern light P1 extend in the same direction in any portion of the identification region R1. That is, the bright portion L1 and the dark portion L2 extend in a direction inclined at 45 degrees with respect to the conveying direction D1 in any portion of the identification region R1. Therefore, the projected pattern light P1 equally includes the vertical component C1 and the horizontal component C2 in any portion of the identification region R1. With such pattern light P1, it is possible to identify the asperity information independently of the fiber direction. That is, since the pattern light P1 equally includes the vertical component C1 and the horizontal component C2, which are orthogonal to each other, the dependence of the pattern light P1 on the fiber direction is the same regardless of whether the sheet Sh1 is "long grain" or "short grain". As a result, when identifying the asperity information based on the variation in the line width of the pattern light P1 on the identification region R1, the asperity identification portion 22 can identify the asperity information independently of the fiber direction.

Another mode of the pattern light P1 including both the vertical component C1 and the horizontal component C2 will be described below.

Figure 12:
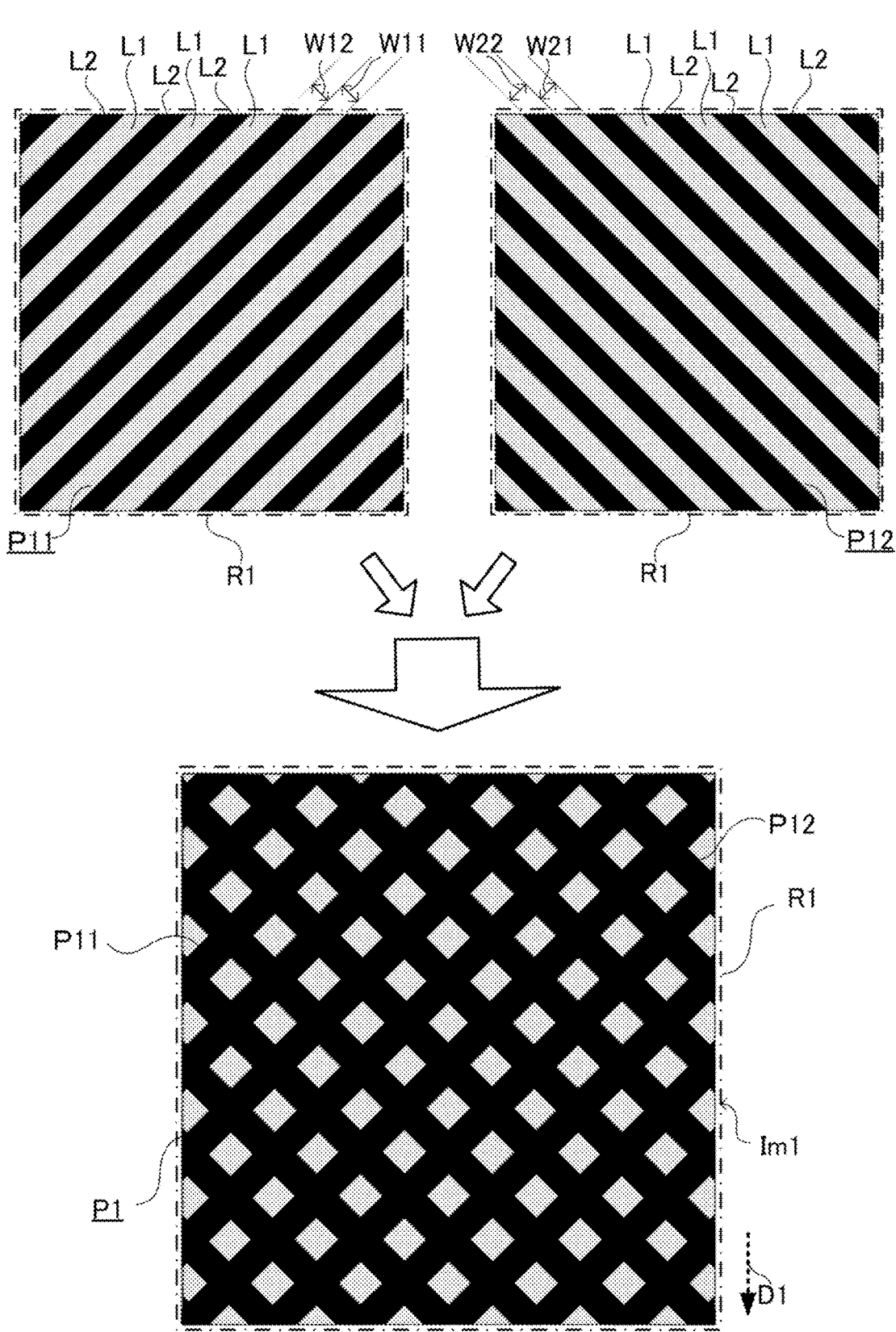
FIG. 12 is a schematic diagram showing one mode of pattern light used in the sheet identification device according to the first embodiment.

In the example of FIG. 12, the projection of the pattern light P1 on the identification region R1 generates a luminance distribution of a lattice pattern including the bright portion L1 and the dark portion L2.

The lattice pattern is a superposition of a first stripe pattern and a second stripe pattern, which are orthogonal to each other. Therefore, as shown in FIG. 12, the pattern light P1 that produces the lattice pattern can be regarded as combined light of first pattern light P11 that produces the first stripe pattern and second pattern light P12 that produces the second stripe pattern. In short, in the example of FIG. 12, the stripe pattern produced by the pattern light P1 includes the first stripe pattern and the second stripe pattern orthogonal to each other. The first pattern light P11 forms, in the identification region R1, the first stripe pattern which is inclined at an angle of 45 degrees with respect to the conveying direction D1 of the sheet Sh1. The second pattern light P12 forms, in the identification region R1, the second stripe pattern which is inclined at an angle of 135 degrees with respect to the conveying direction D1 of the sheet Sh1. In the example of FIG. 12, the dark portion L2 is prioritized in portions where the bright portion L1 and the dark portion L2 of the first pattern light P11 and the second pattern light P12 overlap, but the present disclosure is not limited to this, and the bright portion L1 may be prioritized. That is, the bright portion L1 (shaded) and the dark portion L2 (blackened) of the lattice pattern shown in FIG. 12 may be reversed.

Here, the line width of the first pattern light P11 and the line width of the second pattern light P12 are the same. As an example, the line width W11 of the bright portion L1 and the line width W12 of the dark portion L2 of the first pattern light P11 are both 80 μm, and the line width W21 of the bright portion L1 and the line width W22 of the dark portion L2 of the second pattern light P12 are both 80 μm.

The pattern light P1 that produces the above-described lattice pattern may be realized by using a lattice-shaped shield 32 or two shields 32 in which slits 321 are formed. In the latter case, the lattice pattern as shown in FIG. 12 can be realized by stacking two shields 32 having slits 321 with different widths such that the orientations of their slits 321 are orthogonal to each other.

When the pattern light P1 of such a lattice pattern is used, the control portion 16 can analyze the line width of the second stripe pattern in addition to the line width of the first stripe pattern when analyzing the identification image Im1. In addition, both of the first pattern light P11 and the second pattern light P12 include both the vertical component C1 and the horizontal component C2. That is, the control portion 16 can calculate the variation in the line width from both the first stripe pattern and the second stripe pattern. In this way, it is possible to acquire at one time the identification image Im1 required for the analysis in two directions orthogonal to each other. In this case, since the identification image Im1 cannot be acquired and analyzed for each row, the entire identification image Im1 needs to be stored in the memory; however, the number of analysis data (values of line widths) that can be acquired increases. That is, by acquiring analysis data from each of the first pattern light P11 and the second pattern light P12, the number of analysis data used for identifying the asperity information is increased, and as a result, the accuracy of identifying the asperity information is further improved.

Figure 13:
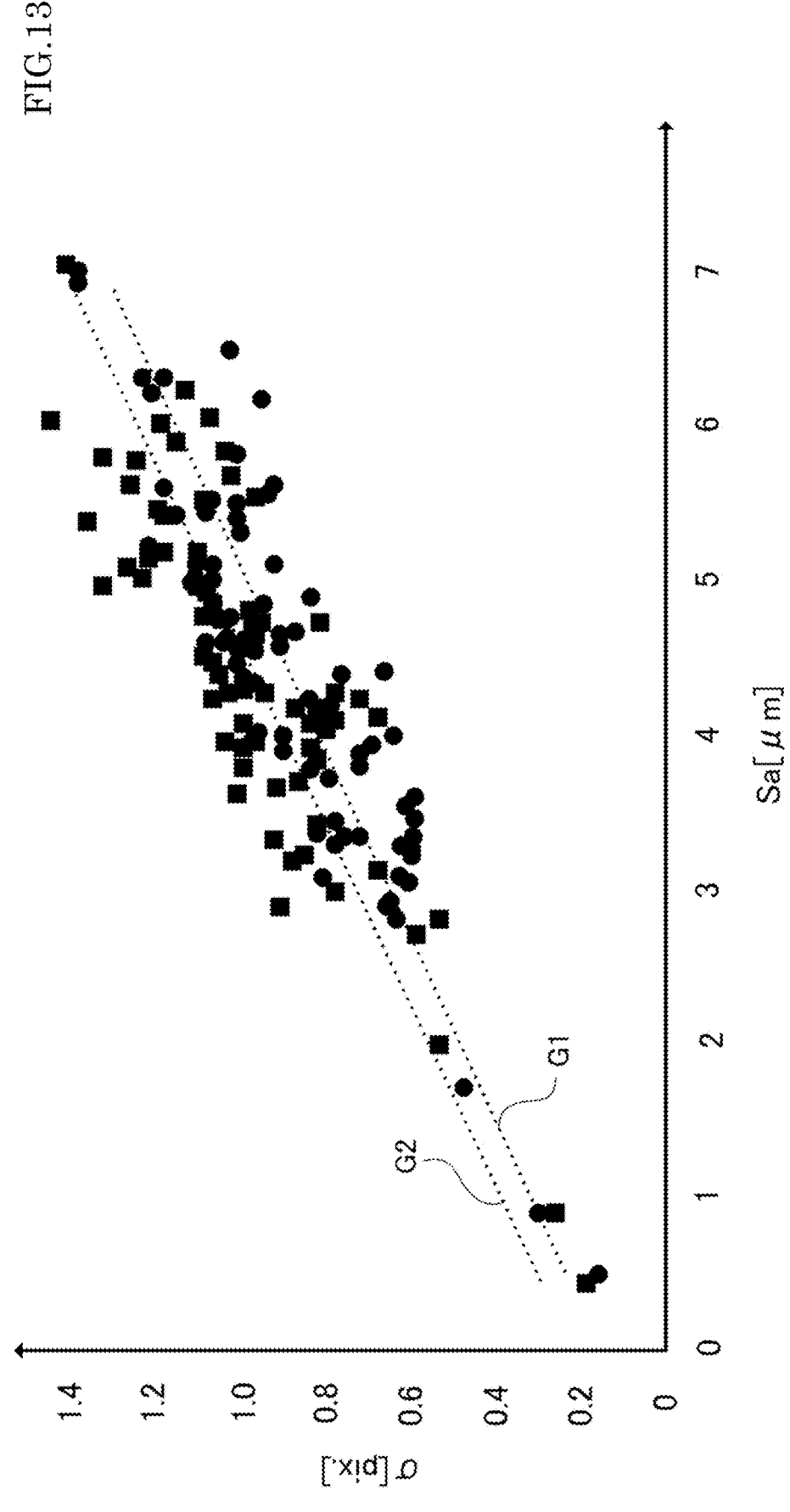
FIG. 13 is a graph showing the relationship between the arithmetic average height and the standard deviation obtained in the sheet identification device according to the first embodiment.

Specifically, use of the lattice pattern as shown in FIG. 12 results in a higher linearity between the standard deviation σ as the asperity information and the arithmetic average height Sa, as shown in, for example, FIG. 13. FIG. 13 is a graph showing the relationship between the standard deviation σ as the asperity information calculated using the pattern light P1 of FIG. 12 and the actual arithmetic average height Sa for a plurality of types of sheets Sh1. In FIG. 13, the horizontal axis represents the arithmetic average height Sa, and the vertical axis represents the standard deviation σ (the standard deviation σ is an average value of five locations in the bright portion L1 or the dark portion L2). As shown in FIG. 13, linear regression models G1 and G2 of the arithmetic average height Sa and the standard deviation σ are calculated from the first pattern light P11 and the second pattern light P12, respectively.

As another example, the pattern light P1 may be a mode in which the first pattern light P11 forms a stripe pattern along the conveying direction D1 and the second pattern light P12 forms a stripe pattern orthogonal to the conveying direction D1. Even in this case, the pattern light P1 includes both the vertical component C1 and the horizontal component C2. As yet another example, a pattern light P1 that forms a graphic pattern such as a circular shape pattern or a square shape pattern, instead of the stripe pattern, on the identification region R1 also includes both the vertical component C1 and the horizontal component C2. That is, the pattern light P1 including the vertical component C1 and the horizontal component C2 may form an arc pattern of an arc that is at least a part of a circle in the identification region R1 (see FIG. 14). Furthermore, when the graphic pattern is a perfect circle pattern, or the like, the pattern light P1 equally includes the vertical component C1 and the horizontal component C2.

[7.2] Fiber Direction Identification Mode

In the fiber direction identification mode, the sheet identification device 2 identifies the fiber direction at the direction identification portion 24. In the fiber direction identification mode, since the asperity identification portion 22 does not identify the asperity information, the function of the asperity identification portion 22 may be disabled. Furthermore, if the sheet identification device 2 operates only in the fiber direction identification mode, the asperity identification portion 22 can be omitted.

In the fiber direction identification mode, the sheet identification device 2 of the image processing apparatus 10 according to the present embodiment uses the dependence of the pattern light P1 on the fiber direction to identify the fiber direction from the identification image Im1.

[7.2.1] Mode of Pattern Light

Figure 14:
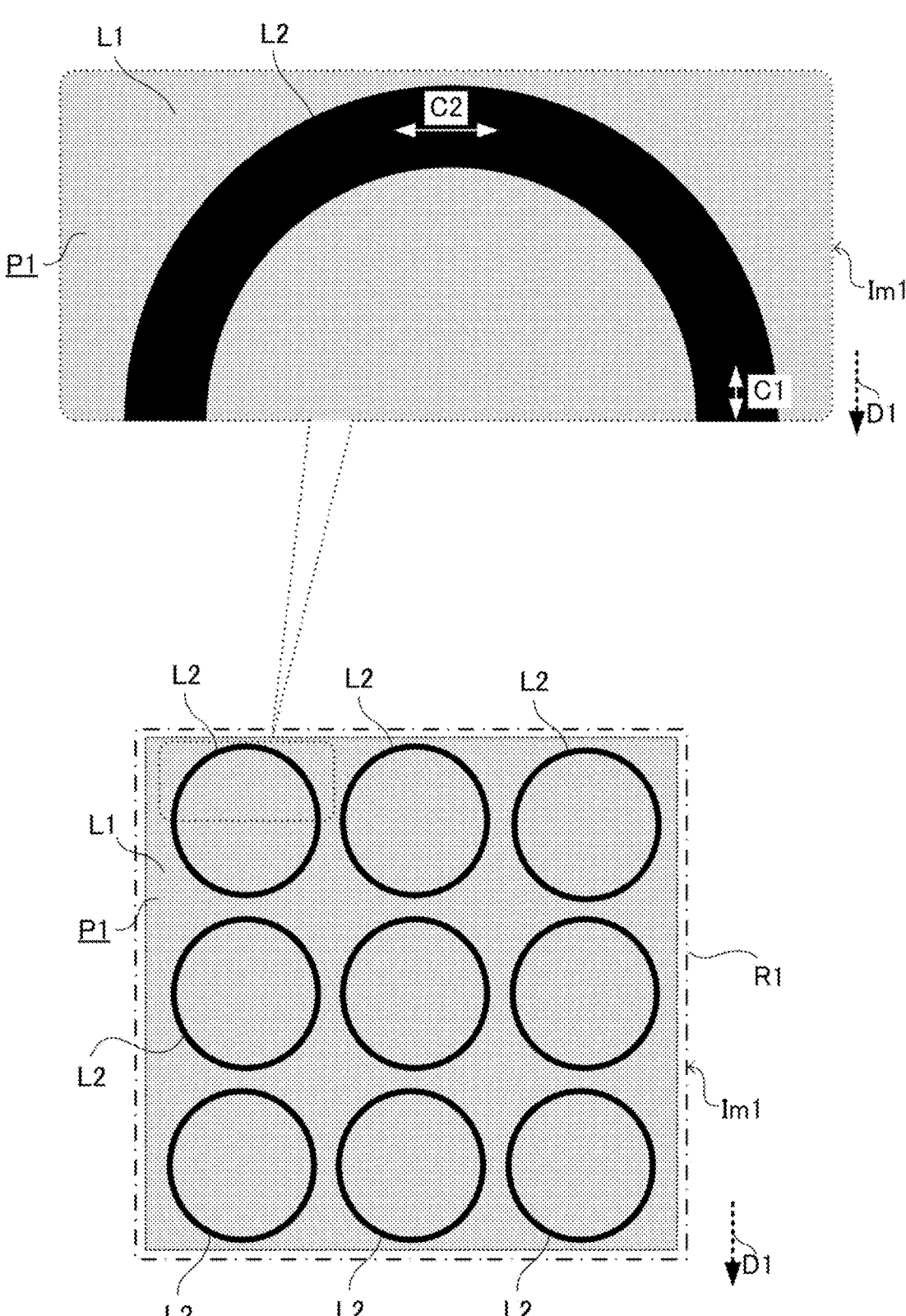
FIG. 14 is a schematic diagram showing one mode of pattern light used in the sheet identification device according to the first embodiment.

Here, as an example, the sheet identification device 2 uses the pattern light P1 including the vertical component C1 and the horizontal component C2 as shown in FIG. 14 to identify the fiber direction. That is, when forming the identification image Im1, the light irradiation portion 3 projects the pattern light P1 including both the vertical component C1 and the horizontal component C2 on the identification region R1.

In the example of FIG. 14, the pattern light P1 forms a graphic pattern in which a plurality of circular shapes are formed by the dark portion L2 in the bright portion L1. That is, the pattern light P1 including the vertical component C1 and the horizontal component C2 as illustrated in FIG. 14 forms an arc pattern of an arc that is at least a part of a circle in the identification region R1. In the example of FIG. 14, the pattern light P1 includes a graphic pattern including a plurality (here, nine) of circular shapes (arcs). In particular, the circular shape graphic pattern includes perfect circles, and the pattern light P1 equally includes the vertical component C1 and the horizontal component C2.

In FIG. 14, the line width of the arc pattern produced by the pattern light P1 is 80 μm. That is, the line width of the pattern light P1 on the identification region R1 is less than 100 μm. That is, the pattern light P1 has a line width that is "dependent on the fiber direction". Note that the relationship between the bright portion L1 and the dark portion L2 may be reversed, for example, the graphic pattern may be formed by the bright portion L1 in the dark portion L2.

Figure 15:
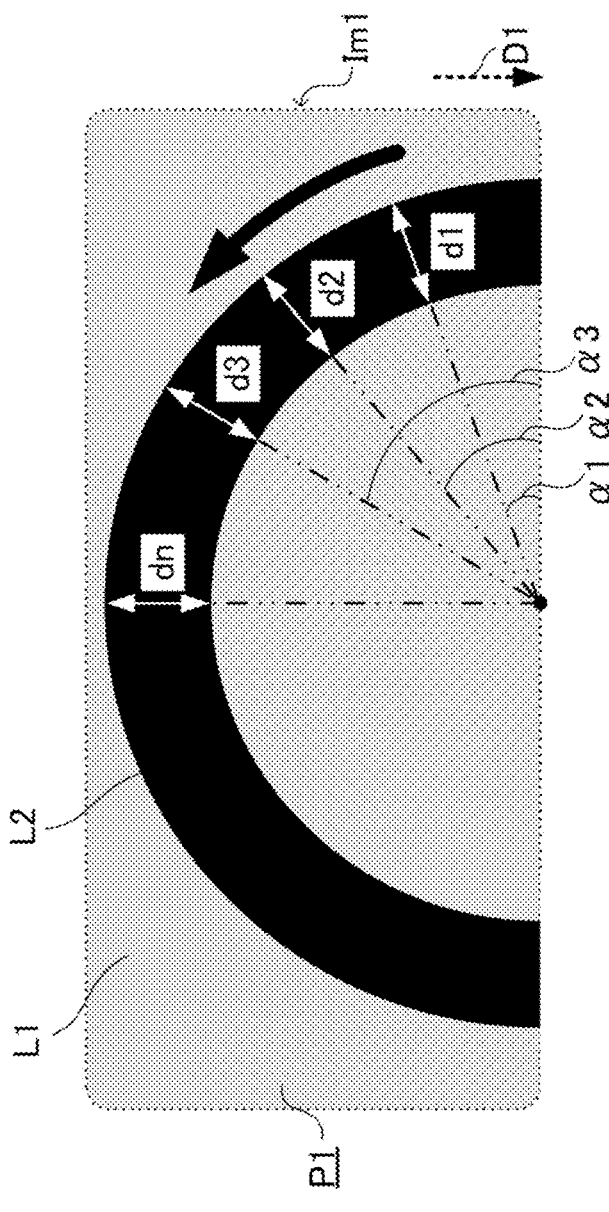
FIG. 15 is a schematic diagram showing one mode of pattern light used in the sheet identification device according to the first embodiment.

From the identification image Im1 of the identification region R1 on which the pattern light P1 that forms such an arc pattern is projected, the fiber direction can be identified based on the magnitude of the variation in the line width in the circumferential direction of the arc. That is, as shown in FIG. 15, where "n" is an integer of 0 or more, when the line width dn of the pattern light P1 is measured by the image processing of the identification image Im1 at every angle $\alpha$n, the fiber direction can be identified from the data of the line width dn. In short, the line width dn is a value obtained by adding the deviation amount $\Delta$dn caused by the asperities to the original line width dc when there is no asperities on the surface A1 of the sheet Sh1 (dn=dc+$\Delta$dn). When the fiber direction and the line segment are parallel to each other, the magnitude |$\Delta$dn| of the variation in the line width dn with respect to the original line width dc is small, and when the fiber direction and the line segment are orthogonal to each other, the magnitude |$\Delta$dn| of the variation in the line width dn with respect to the original line width dc is large.

Figure 16:
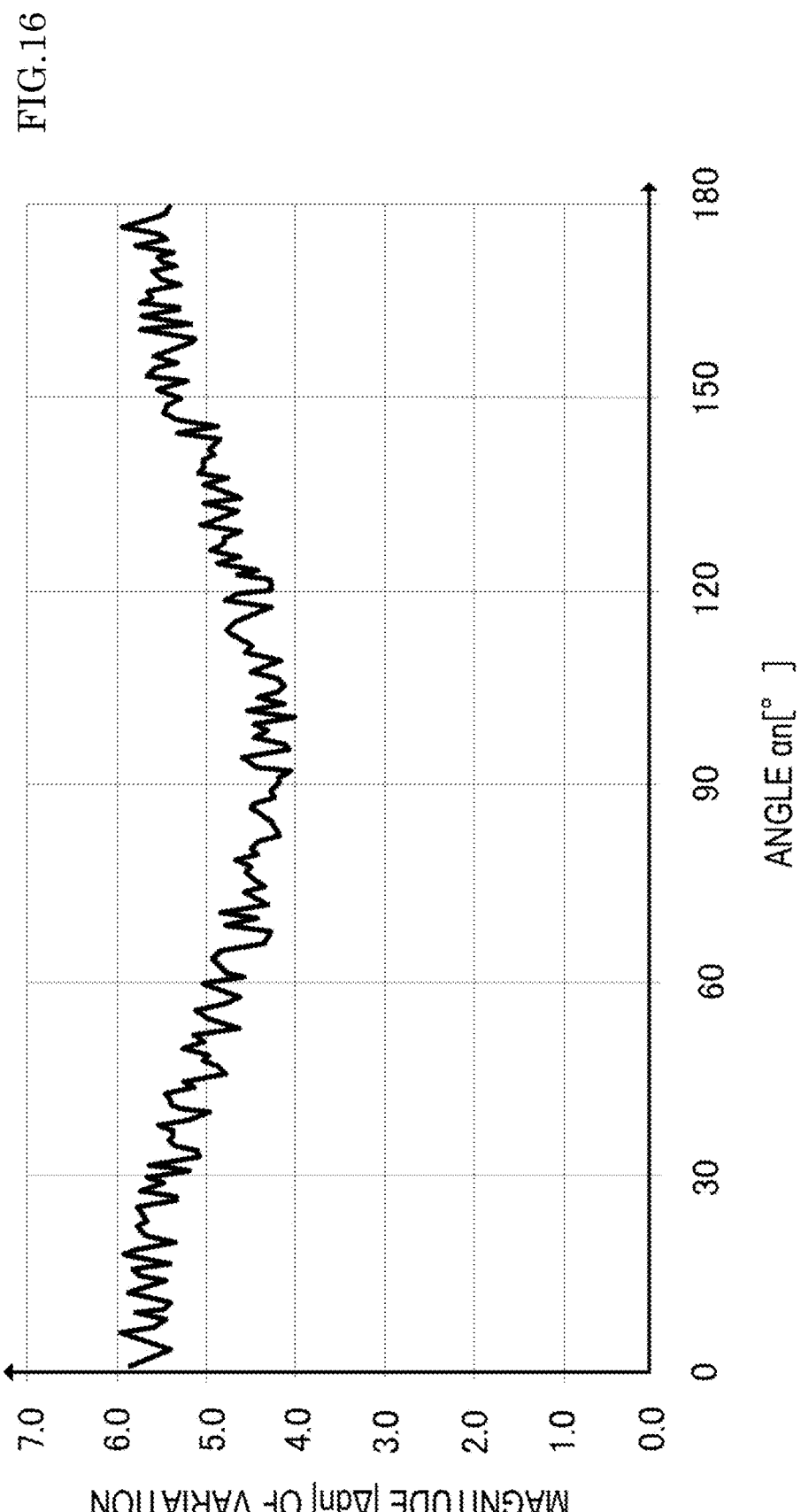
FIG. 16 is a graph showing the magnitude of the variation in the line width obtained in the sheet identification device according to the first embodiment.

If it is only necessary to determine whether the relationship between the fiber direction and the line segment is close to parallel or close to orthogonal, it is sufficient to measure the line width dn for a half circumference of the arc, that is, in the range of 0 to 180 degrees of the angle $\alpha$n with respect to the horizontal component C2 orthogonal to the conveying direction D1. When the line width dn is measured at each angle $\alpha$n while gradually changing the angle $\alpha$n from 0 degrees to 180 degrees, the magnitude |$\Delta$dn| of the variation in the line width dn and the angle $\alpha$n have a relationship as shown in FIG. 16, for example. In FIG. 16, the horizontal axis represents the angle $\alpha$n (0 to 180 degrees), and the vertical axis represents the magnitude |$\Delta$dn| of the variation in the line width dn with respect to the original line width dc.

As the angle between the fiber direction and the line segment becomes closer to orthogonal, that is, as the direction represented by the angle $\alpha$n becomes closer to the fiber direction, the magnitude |$\Delta$dn| of the variation becomes smaller; therefore, if there is no error, the angle $\alpha$n at which the magnitude |$\Delta$dn| of the variation becomes the minimum indicates the fiber direction. In the example of FIG. 16, the magnitude |$\Delta$dn| of the variation is the minimum when the angle $\alpha$n is around 90 degrees; accordingly, the fiber direction is estimated to be the direction where the angle $\alpha$n is 90 degrees. However, in practice, since a measurement error of the line width dn and the variation in the line width dn due to the asperities on the surface A1 are also included, it is preferable that the fiber direction of the surface A1 of the sheet Sh1 is identified by performing the same calculation for a plurality of arcs and taking their average.

Here, the resolution relating to the identification of the fiber direction is determined by the increment of the angle $\alpha$n (the amount of change from the angle $\alpha$n to the angle $\alpha$(n+1)) when the angle $\alpha$n is gradually changed from 0 degrees to 180 degrees. That is, the smaller the increment of the angle $\alpha$n is, the higher the fiber direction identification resolution is.

However, the mode of the pattern light P1 used in the fiber direction identification mode is not limited to the arc pattern. The pattern light P1 may produce a polygonal shape pattern or a pattern that changes with time such as a moving image (including an animation) in which a line segment rotates.

[7.2.2] Specific Processing

Figure 17:
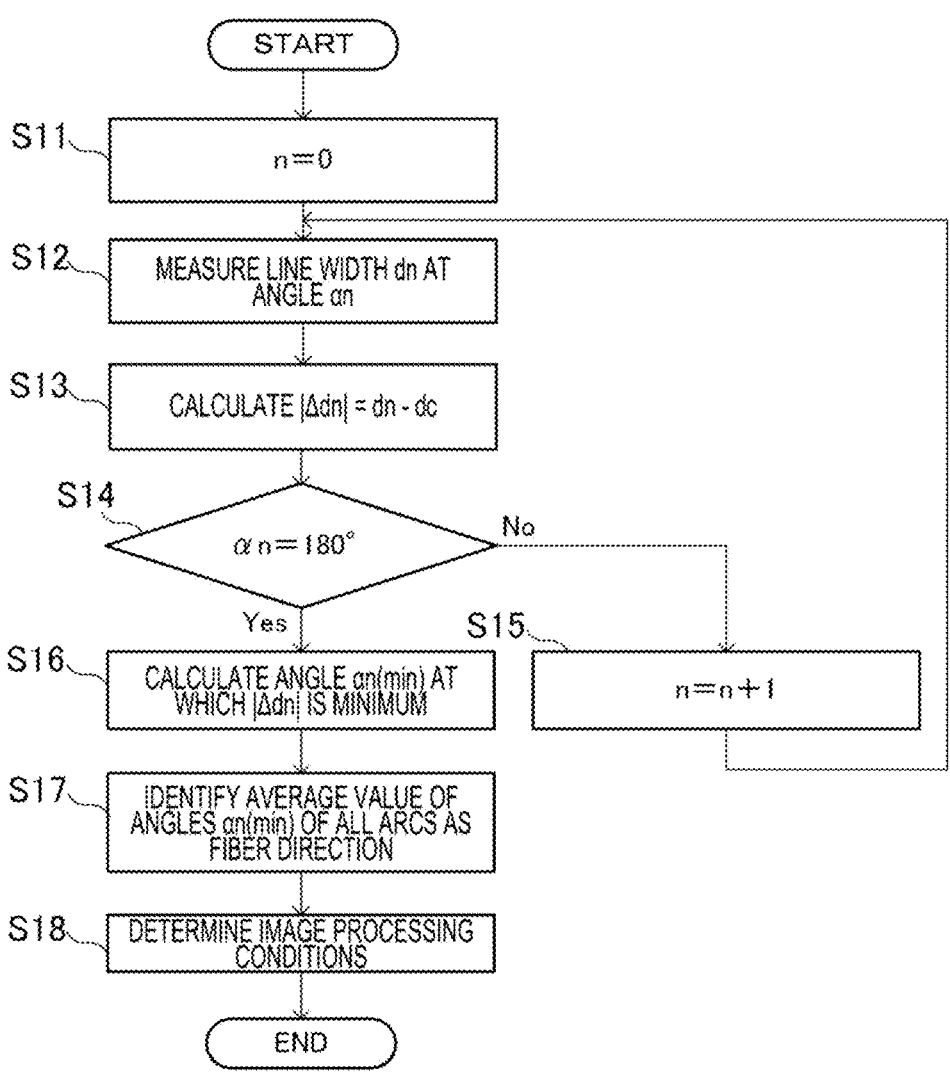
FIG. 17 is a flowchart of an example operation of the sheet identification device according to the first embodiment.

Next, specific processing for identifying fiber information based on the identification image Im1 by the direction identification portion 24 will be described with reference to FIG. 17. Steps S11, S12, . . . in the flowchart shown in FIG. 17 represent the numbers of the processing procedure (steps) executed by the control portion 16.

<Steps S11 and S12>

In step S11, the control portion 16 sets "n" to "0". In step S12, the control portion 16 measures, at the direction identification portion 24, the line width dn at the angle $\alpha$n in the identification image Im1. In the first step S12 after the processing starts, since "n=0", the line width do at the angle $\alpha$0 (=0 degrees) is measured.

<Step S13>

In step S13, the control portion 16 calculates, at the direction identification portion 24, the magnitude |$\Delta$dn| of the variation in the line width dn with respect to the original line width dc. At this time, the direction identification portion 24 calculates the difference between the original line width dc and the line width dn as the magnitude |$\Delta$dn| of the variation.

<Steps S14 and S15>

In step S14, the control portion 16 determines whether or not the angle $\alpha$n has reached the maximum value of 180 degrees. When the angle $\alpha$n has not reached 180 degrees (S14: No), the control portion 16 shifts the processing to step S15. When the angle $\alpha$n has reached 180 degrees (S14: Yes), the control portion 16 shifts the processing to step S16. In step S15, the control portion 16 increments "n" and shifts the processing to step S12.

<Step S16>

In step S16, the control portion 16 calculates, at the direction identification portion 24, the angle $\alpha$n at which the magnitude |$\Delta$dn| of the variation is the minimum as "$\alpha$n (min)". That is, the direction identification portion 24 identifies the angle $\alpha$n at which the minimum value of the magnitude |$\Delta$dn| of the variation was obtained, among a plurality of magnitudes |$\Delta$dn| of the variation obtained when the angle $\alpha$n is changed from 0 degrees to 180 degrees by a predetermined increment.

<Step S17>

In step S17, the control portion 16 determines, at the direction identification portion 24, the fiber direction by averaging "$\alpha$n(min)" of all arcs. That is, the direction identification portion 24 performs the same calculation as in steps S11 to S16 for a plurality of arcs, and uses the average value of "$\alpha$n(min)" (the angles $\alpha$n at which the magnitude |$\Delta$dn| of the variation is the minimum) obtained by the calculations as the fiber direction. Accordingly, it is possible to identify the fiber direction while reducing the influence of the measurement error of the line width dn and the variation in the line width dn due to the asperities on the surface A1.

<Step S18>

In step S18, the control portion 16 determines, at the condition determination portion 23, image processing conditions. That is, the condition determination portion 23 determines the image processing conditions including image forming conditions in accordance with the fiber direction identified in step S17. As an example, the condition determination portion 23 predicts the curl direction in accordance with the identified fiber direction, and sets image processing conditions for curl correction. Thus, when an image is formed on the sheet Sh1 by the image forming portion 13, the image forming conditions corresponding to the fiber direction of the surface A1 of the sheet Sh1 are automatically applied.

The procedure of the fiber direction identification method described above is merely an example, and the order of the processes shown in the flowchart of FIG. 17 may be changed as appropriate.

[7.3] All Identification Mode

In the all identification mode, the sheet identification device 2 identifies the asperity information at the asperity identification portion 22, and identifies the fiber direction at the direction identification portion 24. In this case, for example, the asperity identification portion 22 identifies the asperity information based on the identification image Im1 as in the asperity identification mode, and the direction identification portion 24 identifies the fiber direction based on the identification image Im1 as in the fiber direction identification mode.

Alternatively, the asperity identification portion 22 may identify the asperity information in consideration of the fiber direction identified by the direction identification portion 24. That is, when the fiber direction is identified, the asperity identification portion 22 can identify the asperity information with high accuracy based on only one of the vertical component C1 and the horizontal component C2, which is less affected by the fiber direction.

[8] Modifications

The plurality of constituent elements included in the image processing apparatus 10 may be distributed across a plurality of housings. For example, at least one of the acquisition portion 21, the asperity identification portion 22, the condition determination portion 23, the direction identification portion 24, the thickness identification portion 25, and the like, which are constituent elements of the sheet identification device 2, is not necessarily be realized as a function of the control portion 16, and may be provided in a separate housing from the control portion 16. That is, the sheet identification device 2 need not necessarily be integrated with the image processing apparatus 10, and at least a part of the sheet identification device 2 may be provided in a separate housing from the image processing apparatus 10.

In addition, the sheet identification device 2 need to have at least the function of identifying the asperities or the fiber direction of the surface A1 of the sheet Sh1, and the function of identifying the thickness of the sheet Sh1, and the like may be omitted as appropriate. For example, when the function of identifying the thickness of the sheet Sh1 is omitted, the thickness sensor 5 and the thickness identification portion 25 may be omitted.

In addition, in the first embodiment, an example is shown in which the optical axis Ax1 of the light irradiation portion 3 is inclined at the predetermined angle θ1 with respect to the identification region R1 of the sheet Sh1, and the optical axis Ax2 of the imaging portion 4 is orthogonal to the identification region R1 of the sheet Sh1, but the present disclosure is not limited to this configuration. For example, the optical axis Ax1 of the light irradiation portion 3 may be orthogonal to the identification region R1 of the sheet Sh1, the optical axis Ax2 of the imaging portion 4 may be inclined with respect to the identification region R1 of the sheet Sh1, or both the optical axis Ax1 and the optical axis Ax2 may be inclined with respect to the identification region R1 of the sheet Sh1.

In addition, the light irradiation portion 3 may include, for example, a projector, and project any pattern light P1 input as projection data on the identification region R1. That is, an image projected from the projector may be projected on the identification region R1 as the pattern light P1. In this case, it is also easy to employ a moving image as the pattern light P1.

In addition, the sheet Sh1 to be irradiated with the pattern light P1 is not limited to the sheet being conveyed, and may be, for example, the sheet Sh1 set in the sheet feed cassette 141. In this case, by moving at least one of the sheet Sh1 and the imaging portion 4 to capture the identification image Im1 in a state where the sheet Sh1 and the imaging portion 4 are relatively moved, a wide area of the sheet Sh1 can be imaged while reducing the image magnification.

Second Embodiment

Figure 18:
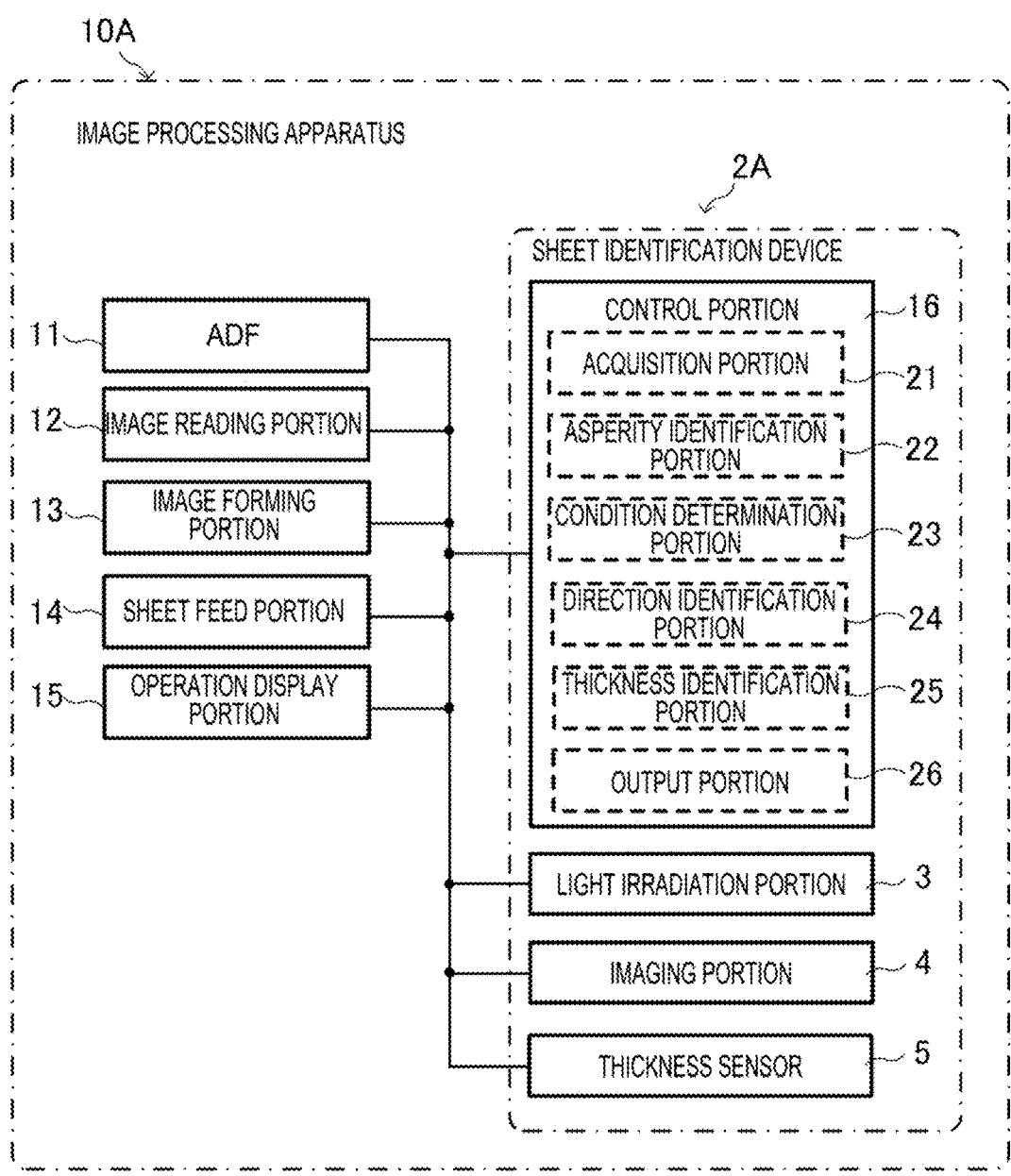
FIG. 18 is a schematic block diagram of an image processing apparatus according to a second embodiment.

The image processing apparatus 10A according to the present embodiment differs from the image processing apparatus 10 according to the first embodiment in that the sheet identification device 2A includes an output portion 26 as shown in FIG. 18. In the following, structures similar to those of the first embodiment are denoted by common reference numerals, and descriptions thereof are omitted as appropriate.

The output portion 26 outputs the identification result of at least one of the asperity identification portion 22, the direction identification portion 24, and the thickness identification portion 25. In the present embodiment, as an example, the output portion 26 outputs the identification result by causing the operation display portion 15 to display the identification result so as to notify the user of the identification result. The mode of the output of the identification result by the output portion 26 is not limited to display on the operation display portion 15, but may be transmission to an external device, writing to a non-temporary recording medium readable by a computer system, or the like. The output portion 26 is provided in the control portion 16 as a function of the control portion 16.

In the case of the identification result of the asperity identification portion 22, what is output from the output portion 26 is, for example, the standard deviation σ as the asperity information, the arithmetic average height (Sa), or information representing the type of the sheet Sh1. Similarly, in the case of the identification result of the direction identification portion 24, what is output by the output portion 26 is, for example, the fiber direction, or information indicating "vertical grain" or "horizontal grain".

In addition, the output portion 26 may output information such as a life estimation result, a recommendation for maintenance timing, or a recommendation for the type of the sheet Sh1, which is estimated from the identification result of the asperity identification portion 22 or the like. For example, parts of the image processing apparatus 10A may be worn when the sheet Sh1 is conveyed, but the rougher the surface A1 of the conveyed sheet Sh1, the more likely the wear progresses. That is, since the degree of deterioration of the image processing apparatus 10A differs depending on the surface roughness or the like of the sheet Sh1 used, the accuracy of the life estimation of the image processing apparatus 10A is improved if the asperity information of the sheet Sh1 is known in addition to the number of conveyed sheets Sh1, for example. Therefore, the output portion 26 can output information such as the life estimation result of the image processing apparatus 10A or a recommendation for maintenance timing of the image processing apparatus 10A by, for example, causing the operation display portion 15 to display the information so as to notify the user of the information. Further, in order to extend the life of the image processing apparatus 10A, the output portion 26 can notify the user of information such as a recommendation for the sheet Sh1 having a higher flatness than the sheet Sh1 in use.

In particular, in the sheet identification device 2A according to the present embodiment, as described in the first embodiment, asperity information having a high linearity with the arithmetic average height (Sa) can be calculated. Therefore, even a sheet Sh1 that is not registered in the database or the like in advance can be reflected, for example, in the life estimation of the image processing apparatus 10A.

The output portion 26 may also output information such as the result of estimation on whether the sheet Sh1 faces up or down, which is estimated from the identification result of the asperity identification portion 22. That is, depending on the type of sheet Sh1, the roughness may be different on the front and back sides of the sheet Sh1, such as the back side being rougher than the front side. Therefore, if the asperity information of each of the front and back sides of the sheet Sh1 is known, it is possible to estimate whether the sheet Sh1 faces up or down. Therefore, the output portion 26 can output information such as the result of estimation on whether the sheet Sh1 faces up or down by, for example, causing the operation display portion 15 to display the information so as to notify the user of the information. In this case, it is necessary to capture the identification images Im1 of both sides of the sheet Sh1 in the thickness direction. Therefore, two sensor units 20 may be disposed so as to sandwich the conveying path T1, or one sensor unit 20 may capture the identification images Im1 of both sides using a mirror or the like, or the sheet Sh1 may be turned over.

As a modification of the second embodiment, the condition determination portion 23 may be omitted as appropriate.

The invention claimed is:

1. A sheet identification device comprising:
a light irradiation portion configured to, when forming an identification image which is an image of an identification region of a surface of a sheet on which image formation or image reading is performed and which is used for identification of a asperity information on a state of the surface of the sheet, project, on the identification region, pattern light including a vertical component along a conveying direction of the sheet and a horizontal component orthogonal to the vertical component, wherein
the pattern light forms, in the identification region, a stripe pattern which is inclined at an angle of 45 degrees with respect to the conveying direction of the sheet and in which a bright portion and a dark portion are alternately arranged on the identification region.

2. The sheet identification device according to claim 1, wherein the pattern light equally includes the vertical component and the horizontal component.

3. The sheet identification device according to claim 1, wherein the stripe pattern includes a first stripe pattern and a second stripe pattern orthogonal to each other.

4. The sheet identification device according to claim 1, wherein a line width of the pattern light on the identification region is less than 100 μm.

5. The sheet identification device according to claim 1, further comprising:
a condition determination portion configured to determine an image processing condition on the image formation or the image reading, based on the surface information.

6. The sheet identification device according to claim 1, wherein a first imaginary straight line connecting the light irradiation portion and a center of the identification region is inclined at a predetermined angle with respect to a second imaginary straight line extending along the conveying direction of the sheet.

7. The sheet identification device according to claim 6, wherein the predetermined angle is 20 degrees or more and 90 degrees or less.

8. The sheet identification device according to claim 1, wherein the light irradiation portion includes:
a light source; and
a shield configured to block part of light output from the light source to allow the first pattern light and the second pattern light to pass therethrough.

9. An image processing apparatus comprising:
the sheet identification device according to claim 1; and
an image processing portion configured to execute at least one of the image formation and the image reading on the sheet.

10. A sheet identification device comprising:
an acquisition portion configured to acquire an identification image which is an image of an identification region on which pattern light is projected of a surface of a sheet on which image formation or image reading is performed, the pattern light including a vertical component along a conveying direction of the sheet and a horizontal component orthogonal to the vertical component; and
a direction identification portion configured to identify a fiber direction of the surface of the sheet, based on the identification image.

11. The sheet identification device according to claim 10, wherein the direction identification portion identifies the fiber direction, based at least on a variation in a line width of the pattern light on the identification region.

12. The sheet identification device according to claim 10, wherein the pattern light forms an arc pattern of an arc that is at least a part of a circle in the identification region.

13. The sheet identification device according to claim 10, wherein a line width of the pattern light on the identification region is less than 100 μm.

14. The sheet identification device according to claim 10, further comprising:
a condition determination portion configured to determine an image processing condition on the image formation or the image reading, based on the fiber direction.

15. The sheet identification device according to claim 10, further comprising:
an asperity identification portion configured to identify asperity information on asperities on the surface of the sheet, based on the identification image.

16. A sheet identification method comprising:
acquiring an identification image which is an image of an identification region on which pattern light is projected of a surface of a sheet on which image formation or image reading is performed, the pattern light including a vertical component along a conveying direction of the sheet and a horizontal component orthogonal to the vertical component; and
identifying a fiber direction of the surface of the sheet, based on the identification image.

* * * * *